United States Patent
Park et al.

(10) Patent No.: US 11,039,495 B2
(45) Date of Patent: Jun. 15, 2021

(54) METHOD INTERLAYER INTERACTION METHOD IN WIRELESS COMMUNICATION SYSTEM AND APPARATUS THEREFOR

(71) Applicant: LG Electronics Inc., Seoul (KR)

(72) Inventors: Sangmin Park, Seoul (KR);
Myungjune Youn, Seoul (KR);
Hyunsook Kim, Seoul (KR); Jinsook Ryu, Seoul (KR); Dongsoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/496,193

(22) PCT Filed: Mar. 20, 2018

(86) PCT No.: PCT/KR2018/003235
§ 371 (c)(1),
(2) Date: Sep. 20, 2019

(87) PCT Pub. No.: WO2018/174525
PCT Pub. Date: Sep. 27, 2018

(65) Prior Publication Data
US 2020/0163145 A1    May 21, 2020

Related U.S. Application Data

(60) Provisional application No. 62/473,490, filed on Mar. 20, 2017.

(51) Int. Cl.
*H04W 76/25* (2018.01)
*H04W 76/18* (2018.01)
(Continued)

(52) U.S. Cl.
CPC ............. *H04W 76/25* (2018.02); *H04W 8/08* (2013.01); *H04W 48/17* (2013.01); *H04W 76/18* (2018.02); *H04W 76/30* (2018.02); *H04W 80/10* (2013.01)

(58) Field of Classification Search
None
See application file for complete search history.

(56) References Cited

U.S. PATENT DOCUMENTS 10,448,419 B2 * 10/2019 Stojanovski .......... H04L 5/1469
2014/0341041 A1    11/2014 Velev et al.
(Continued)

FOREIGN PATENT DOCUMENTS

| EP | 2605606 | 1/2012 |
|----|---------|--------|
| JP | 2015505187 | 2/2015 |
| JP | 2015511409 | 4/2015 |

OTHER PUBLICATIONS

Qualconim Incorporated, "TS 23.502: Procedures for use of NAS Transport," S2-170827, SA WG2 Meeting #119, Dubrovnik, Croatia, dated Feb. 13-17, 2017, 5 pages.
(Continued)

*Primary Examiner* — Anh Ngoc M Nguyen
(74) *Attorney, Agent, or Firm* — Fish & Richardson P.C.

(57) ABSTRACT

According to an aspect of the present invention, a method for transporting a non-access stratum (NAS) message of an access and mobility management function (AMF) in a wireless communication system may include: receiving, from a user equipment (UE), an uplink (UL) NAS message including a session management (SM) message for a request related to a protocol data unit (PDU) session; transporting, to a predetermined second Session Management Function (SMF), the SM message if it is determined that it is impossible to route the SM message to a first SMF as a transport target of the SM message; receiving, from the
(Continued)

second SMF, an SM rejection message for the SM message; and transmitting, to the UE, a downlink (DL) NAS message including the SM rejection message.

15 Claims, 20 Drawing Sheets

(51) Int. Cl.
  *H04W 76/30* (2018.01)
  *H04W 8/08* (2009.01)
  *H04W 48/00* (2009.01)
  *H04W 80/10* (2009.01)

(56) References Cited

U.S. PATENT DOCUMENTS

| | | | |
|---|---|---|---|
| 2015/0256961 A1 | 9/2015 | Kim et al. | |
| 2017/0171752 A1* | 6/2017 | Lee | H04W 76/10 |
| 2020/0053685 A1* | 2/2020 | Chandramouli | H04W 48/02 |
| 2020/0059989 A1* | 2/2020 | Velev | H04W 36/12 |

OTHER PUBLICATIONS

3rd Generation Partnership Project; Technical Specification Group Services and System Aspects; "Study on Architecture for Next Generation System (Release 14)," 3GPP TR 23.799 V14.0.0, dated Dec. 2016, 524 pages.

3rd Generation Partnership Project; Technical Specification Group Services and System Aspects; "Procedures for the 5G System; Stage 2 (Release 15)," 3GPP TS 23.502 V0.2.0, dated Feb. 2017, 73 pages.

3rd Generation Partnership Project; Technical Specification Group Services and System Aspects; "System Architecture for the 5G System; Stage 2 (Release 15)" 3GPP TS 23.501 V0.3.1, dated Mar. 2018, 99 pages.

Ericsson, Verizon, Nokia, Nokia Shanghai Bell, LG Electronics, Samsung, "5G SM transport—AMF unable to forward SM message towards SMF," C1-174298, 3GPP TSG-CT WG1 Meeting #106, Kochi (India), Oct. 23-27, 2017, 4 pages.

Extended European Search Report in European Appln. No. 18770400.2, dated Jun. 22, 2020, 13 pages.

PCT International Search Report in International Appln. No. PCT/KR2018/003234, dated Jul. 19, 2018, 7 pages (with English translation).

Qualcomm Inc., "Way forward on Key Issue 4 on Session Management for WT1 and WT2," S2-165766, SA WG2 Meeting #117, Oct. 17-21, 2016, Kaohsiung City, Taiwan, 22 pages.

Qualcomm Incorporated, "23.502—Procedures for Session management for LBO traffic in roaming Scenarios," S2-170749, SA WG2 Meeting #S2-119, 13017 Feb. 2017, Dubrovnik, Croatia, 8 pages.

JP Office Action in Japanese Appln. No. 2019-552096, dated Nov. 17, 2020, 5 pages (with English translation).

Universal Mobile Telecommunications System (UMTS); LTE, "Non-Access-Stratum (NAS) protocol for Evolved Packet System (EPS); Stage 3 (3GPP TS 24.301 version 14.3.0 Release 14)," ETSI TS 124 301, V14.3.0, dated Mar. 2017, 468 pages.

* cited by examiner (a) Control plane protocol stack (b) User plane protocol stack (a) Control plane protocol stack (b) User plane protocol stack (a)

(b)

METHOD INTERLAYER INTERACTION METHOD IN WIRELESS COMMUNICATION SYSTEM AND APPARATUS THEREFOR

This application is a National Stage application under 35 U.S.C. § 371 of International Application No. PCT/KR2018/003235, having an International Filing Date of Mar. 20, 2018, which claims the benefit of U.S. Provisional Ser. No. 62/473,490 filed Mar. 20, 2017. The disclosures of the prior applications are considered part of, and are incorporated by reference in, the disclosure of this application.

TECHNICAL FIELD

The present invention relates to a wireless communication system, and more particularly, to a method for processing a non-access stratum (NAS) message which is unsuccessfully transmitted/routed through interlayer interaction/information change and an apparatus therefor.

BACKGROUND ART

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support accommodation of explosive data traffic, an epochal increase of transmission rate per user, accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

Particularly, for the device in which power consumption significantly influences on the life of the device, various techniques for decreasing the power consumption has been vigorously developed.

DISCLOSURE

Technical Problem

An object of the present invention is to propose a method for properly processing/handling a situation in which routing/transmission of an SM message in an AMF may occur due to separation of MM and SM functions in a new wireless communication system in terms of a terminal and a network.

Embodiments for a method and an apparatus for achieving the above-described technical object are proposed. The technical objects of the present invention are not limited to the aforementioned technical objects, and other technical objects, which are not mentioned above, will be apparently appreciated by a person having ordinary skill in the art from the following description.

Technical Solution

According to an aspect of the present invention, a method for transporting a non-access stratum (NAS) message of an access and mobility management function (AMF) in a wireless communication system may include: receiving, from a user equipment (UE), an uplink (UL) NAS message including a session management (SM) message for a request related to a protocol data unit (PDU) session; transporting, to a predetermined second Session Management Function (SMF), the SM message if it is determined that it is impossible to route the SM message to a first SMF as a transport target of the SM message; receiving, from the second SMF, an SM rejection message for the SM message; and transmitting, to the UE, a downlink (DL) NAS message including the SM rejection message.

Further, the second SMF may be an SMF defined independently of the first SMF to process routing impossibility of the SM message.

Furthermore, the second SMF may be a default SMF.

Furthermore, the SM message may be transported to the second SMF through a first N11 message.

Furthermore, a reason for the routing impossibility of the SM message may be transported to the second SMF through the first N11 message together with the SM message.

Furthermore, the method may further include receiving, from the second SMF, a retry backoff timer value of the request related to the PDU session.

Furthermore, the method may further include receiving, from the first SMF, a second N11 message if the PDU session is locally released.

Furthermore, the second N11 message may include an ID, a local release indication, or a local release reason of the PDU session.

Furthermore, the ID, the local release indication, and/or the local release reason of the PDU session may be transported from the AMF to the second SMF or from the first SMF to the second SMF.

Furthermore, the method may further include updating state information for the locally released PDU session.

Furthermore, if a request target related to the PDU session through the SM message is the locally released PDU session, it may be determined that it is impossible to route the SM message to the first SMF.

Furthermore, according to another aspect of the present invention, an access and mobility management function (AMF) for transporting a non-access stratum (NAS) message in a wireless communication system may include: a communication module transmitting/receiving a signal; and a processor controlling the communication module, in which the processor may be configured to receive, from a user equipment (UE), an uplink (UL) NAS message including a session management (SM) message for a request related to a protocol data unit (PDU) session, transport, to a predetermined second SMF, the SM message if it is determined that it is impossible to route the SM message to a first SMF as a transport target of the SM message, receive, from the second SMF, an SM rejection message for the SM message, and transmit, to the UE, a downlink (DL) NAS message including the SM rejection message.

Further, the second SMF may be an SMF defined independently of the first SMF to process routing impossibility of the SM message.

Furthermore, the SM message may be transported to the second SMF through a first N11 message.

Furthermore, a reason for the routing impossibility of the SM message may be transported to the second SMF through the first N11 message together with the SM message.

Advantageous Effects

According to an embodiment of the present invention, since it is possible to perform inter-NAS layer/entity interaction/information exchange which against various message transmission/routing failure situations which may occur when an SM layer procedure and an MM layer procedure are independently separated and simultaneously performed in 5GS and 5GC, message transmission reliability/efficiency of a terminal and a network can be enhanced and various problems can be solved, which may occur due a message transmission/routing failure.

Advantages which can be obtained in the present invention are not limited to the aforementioned effects and other unmentioned advantages will be clearly understood by those skilled in the art from the following description.

DESCRIPTION OF DRAWINGS

The accompanying drawings, which are included to provide a further understanding of the invention as a part of detailed descriptions, illustrate embodiment(s) of the invention and together with the descriptions, serve to explain the technical principles of the invention.

MODE FOR INVENTION

Figure 1:
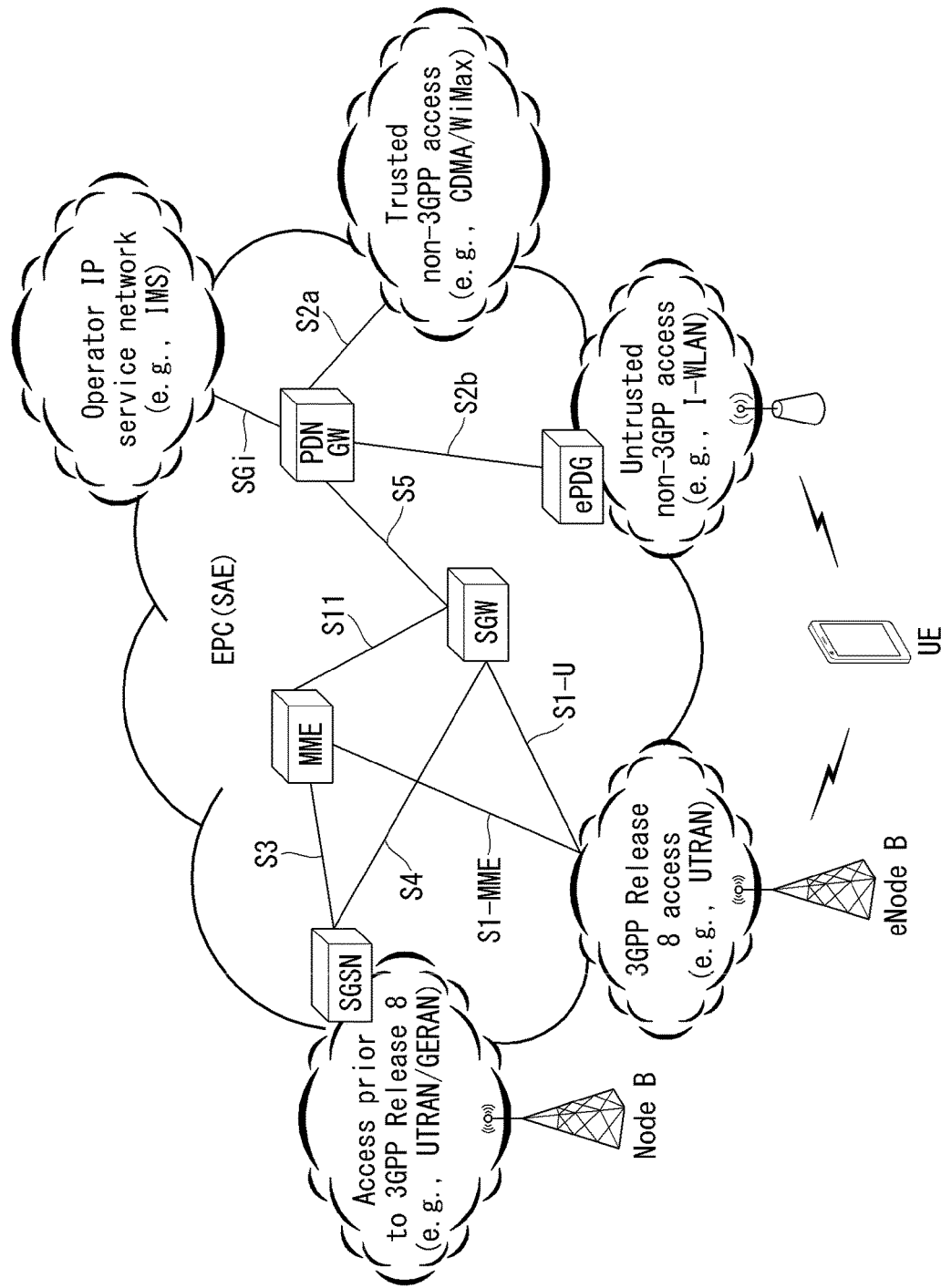
FIG. 1 illustrates an Evolved Packet System (EPS) to which the present invention can be applied.

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.
Universal Mobile Telecommunication System (UMTS): the 3rd generation mobile communication technology based on GSM, developed by the 3GPP
Evolved Packet System (EPS): a network system comprising an Evolved Packet Core (EPC), a packet switched core network based on the Internet Protocol (IP) and an access network such as the LTE and UTRAN. The EPS is a network evolved from the UMTS.
NodeB: the base station of the UMTS network. NodeB is installed outside and provides coverage of a macro cell.
eNodeB: the base station of the EPS network. eNodeB is installed outside and provides coverage of a macro cell.
Home NodeB: It is installed indoors as a based station, and the coverage is a micro cell scale.
Home eNodeB: It is installed indoors as a base station of the EPS network, and the coverage is a micro cell scale.
User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.
IP Multimedia Subsystem (IMS): a sub-system providing multimedia services based on the IP
International Mobile Subscriber Identity (IMSI): a globally unique subscriber identifier assigned in a mobile communication network
Machine Type Communication (MTC): communication performed by machines without human intervention. It may be called Machine-to-Machine (M2M) communication.
MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.
MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.
(MTC) application: services (to which MTC is applied) (for example, remote metering, traffic movement tracking, weather observation sensors, and so on)
(MTC) Application Server: a server on a network in which (MTC) applications are performed
MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.
MTC user: an MTC user uses a service provided by an MTC server.
MTC subscriber: an entity having a connection relationship with a network operator and providing services to one or more MTC terminals.
MTC group: an MTC group shares at least one or more MTC features and denotes a group of MTC terminals belonging to MTC subscribers.
Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.
External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.
Domain identifier: an identifier used for identifying a domain in the control region of a mobile communication network service provider. A service provider can use a separate domain identifier for each service to provide an access to a different service.
Local identifier: an identifier used for deriving or obtaining an International Mobile Subscriber Identity (IMSI). A local identifier should be unique within an application domain and is managed by a mobile communication network service provider.
Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

MME (Mobility Management Entity): A network node in an EPS network, which performs mobility management and session management functions PDN-GW (Packet Data Network Gateway): A network node in the EPS network, which performs UE IP address allocation, packet screening and filtering, and charging data collection functions.

Serving GW (Serving Gateway): A network node in the EPS network, which performs functions such as mobility anchor, packet routing, idle mode packet buffering, and triggering paging for the ME of MME Policy and Charging Rule Function (PCRF): A node in the EPS network, which performs policy decision to dynamically apply differentiated QoS and billing policies for each service flow Open Mobile Alliance Device Management (OMA DM): A protocol designed to manage mobile devices such as mobile phones, PDAs, and portable computers, which performs such functions as device configuration, firmware upgrade, and error report Operation Administration and Maintenance (OAM): A network management function group which provides network fault indication, performance information, and data and diagnostic functions NAS configuration MO (Management Object): A Management Object (MO) used to configure the UE with the parameters associated with the NAS functionality.

PDN (Packet Data Network): A network in which a server supporting a specific service (e.g., MMS server, WAP server, etc.) is located.

PDN connection: A connection from the UE to the PDN, that is, the association (connection) between the UE represented by the IP address and the PDN represented by the APN.

APN (Access Point Name): A string that refers to or identifies the PDN. It is a name (string) (e.g., internet.mnc012.mcc345.gprs) predefined in the network when the P-GW is accessed to access the requested service or network (PDN).

Home Location Register (HLR)/Home Subscriber Server (HSS): A database (DB) that represents subscriber information in the 3GPP network.

NAS (Non-Access-Stratum): The upper stratum of the control plane between the UE and the MME. It supports mobility management, session management and IP address maintenance between the UE and the network.

AS (Access-Stratum): It includes the protocol stack between the UE and the radio (or access) network and is responsible for transmitting data and network control signals.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra- LMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or |

TABLE 1-continued

| Reference point | Description |
| --- | --- |
| | an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

Figure 2:
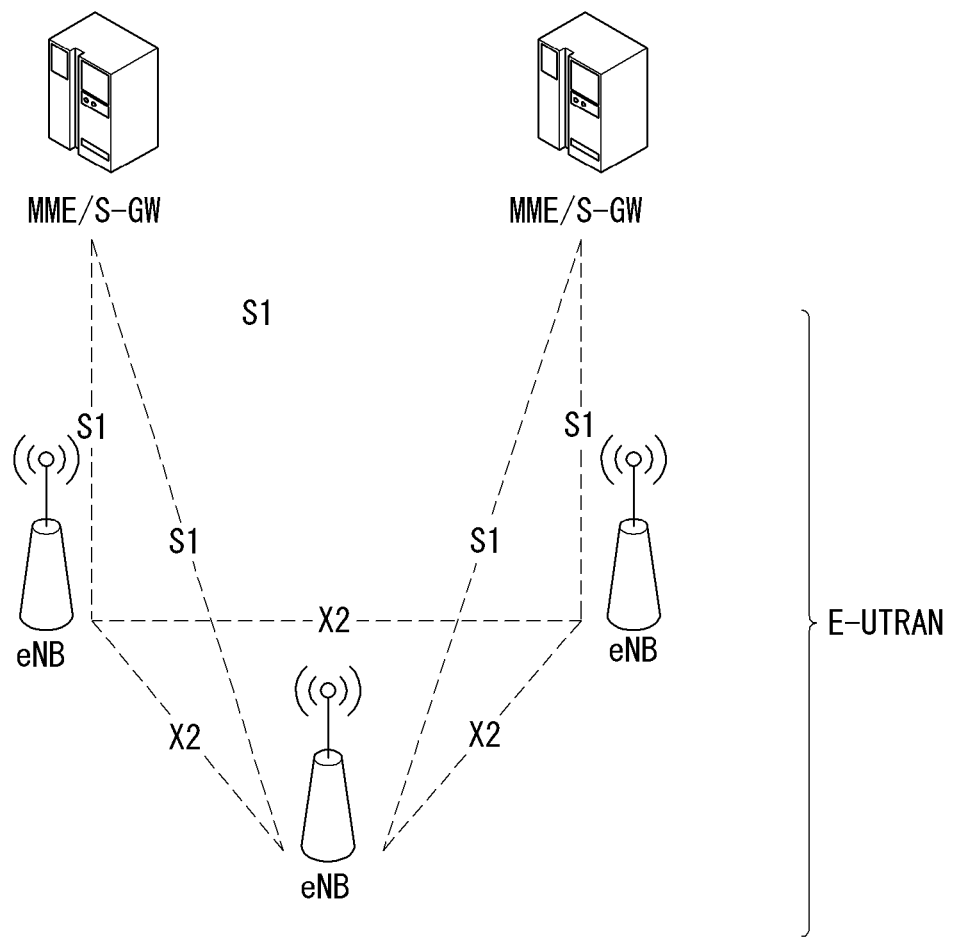
FIG. 2 illustrates one example of an Evolved Universal Terrestrial Radio Access Network (E-UTRAN) to which the present invention can be applied.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, NAS signaling transport, network sharing, MME load balancing management, and so on. The S1 interface supports many-to-many-relation between the eNB and the MME/S-GW.

An MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

Figure 3:
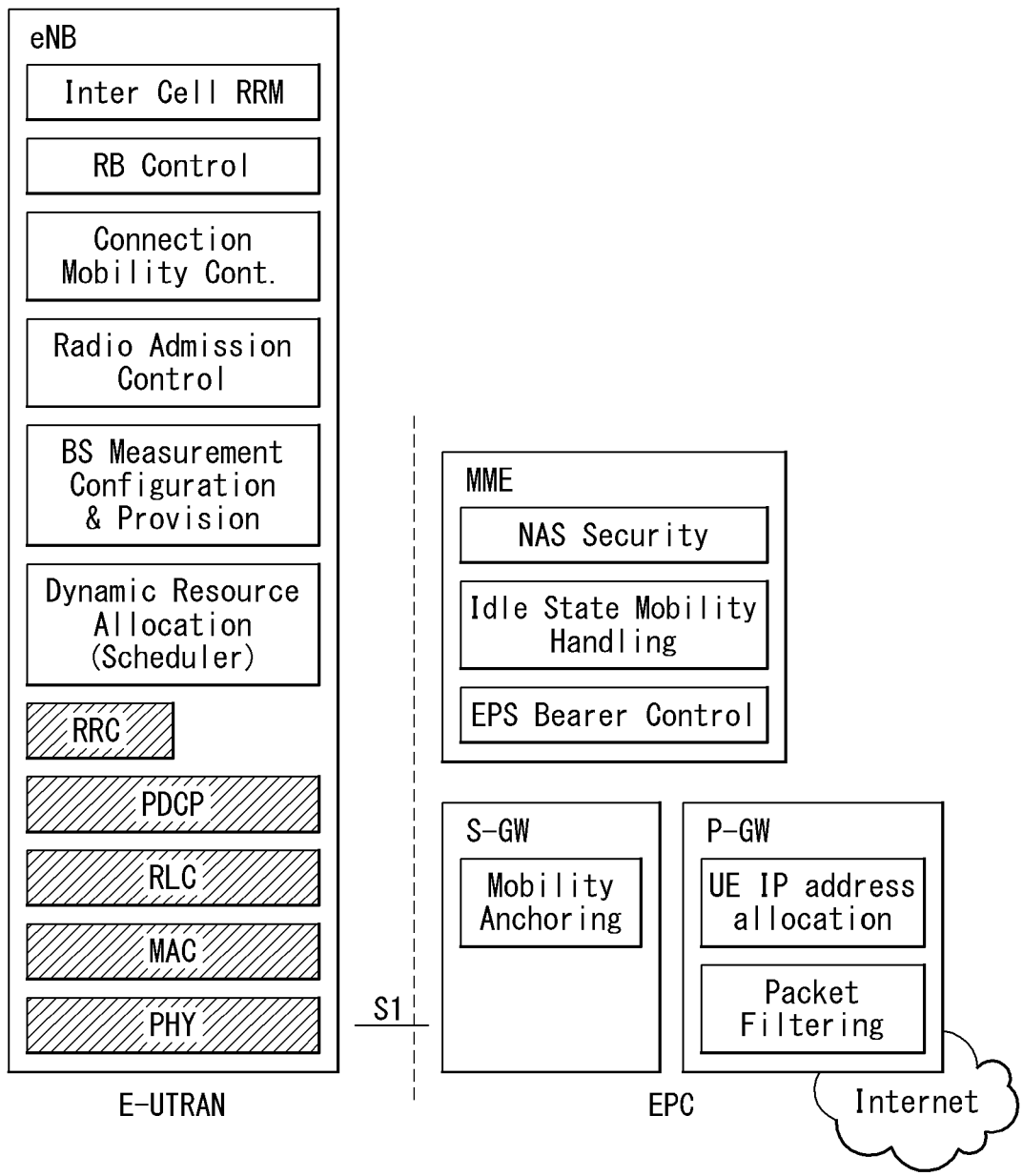
FIG. 3 illustrates structures of an E-UTRAN and an EPC in a wireless communication system to which the present invention may be applied.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during RRC (Radio Resource Control) activation, scheduling and transmission of a BCH (Broadcast Channel), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, SAE (System Architecture Evolution) bearer control, and ciphering of NAS signaling and integrity protection.

Figure 4:
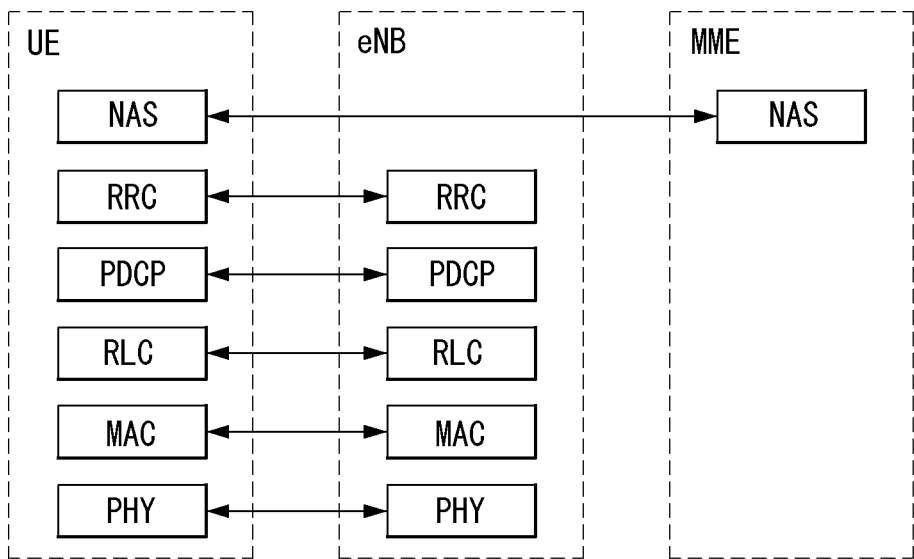
FIG. 4 illustrates a radio interface protocol structure between a UE and an E-UTRAN in a wireless communication system to which the present invention may be applied.
Figure 4:
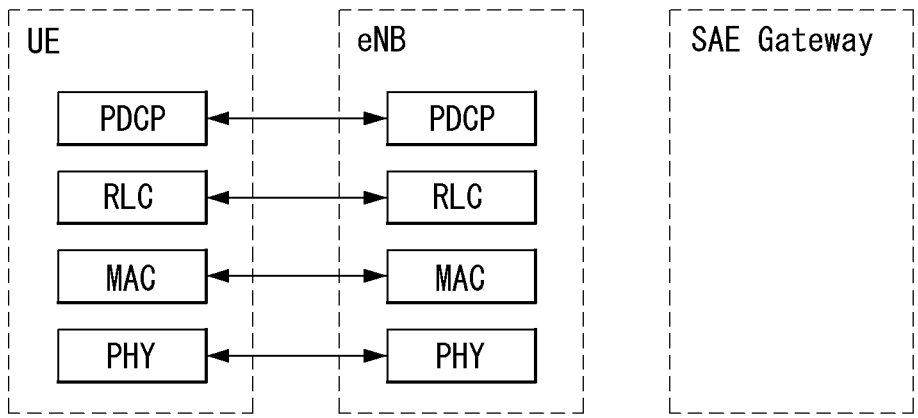

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

Figure 5:
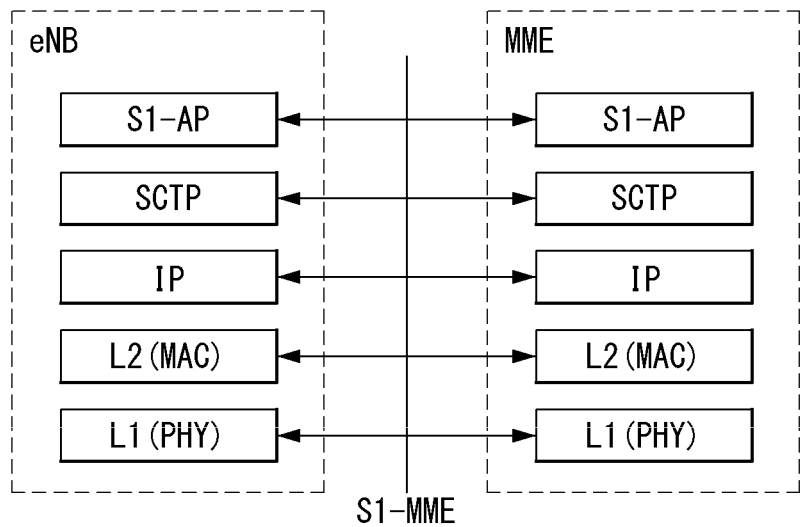
FIG. 5 illustrates an S1 interface protocol structure in a wireless communication system to which the present invention may be applied.
Figure 5:
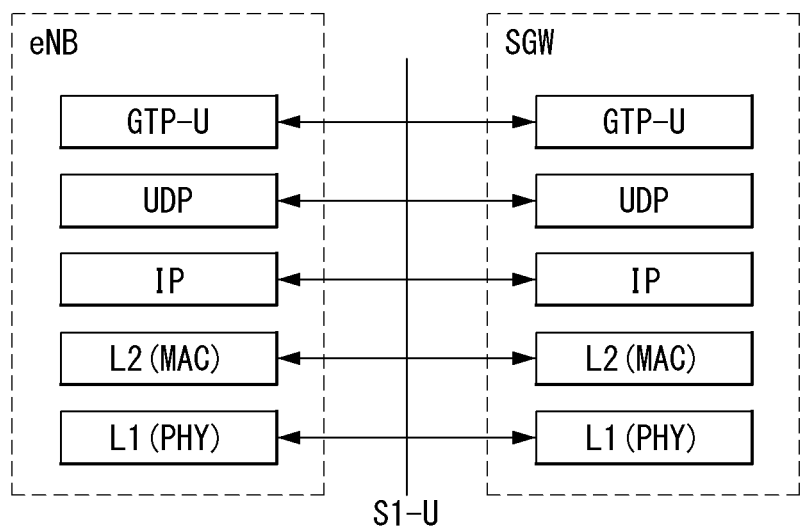

FIG. 5 illustrates an S1 interface protocol structure in a wireless communication system to which the present invention can be applied.

FIG. 5(*a*) illustrates the control plane protocol stack in the S1 interface, and FIG. 5(*b*) illustrates the user plane interface protocol structure in the S1 interface.

With reference to FIG. 5, the S1 control plane interface (S1-MME) is defined between the eNB and the MME. Similar to the user plane, the transport network layer is based on IP transmission. However, to ensure reliable transmission of message signaling, the transport network layer is added to the Stream Control Transmission Protocol (SCTP) layer which sits on top of the IP layer. The application layer signaling protocol is called S1 Application Protocol (S1-AP).

The SCTP layer provides guaranteed delivery of application layer messages.

The transport IP layer employs point-to-point transmission for Protocol Data Unit (PDU) signaling transmission.

For each S1-MME interface instance, single SCTP association uses a pair of stream identifiers for the S-MME common procedure. Only part of stream identifier pairs is used for the S1-MME dedicated procedure. The MME communication context identifier is allocated by the MME for the S1-MME dedicated procedure, and the eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

In case the S1 signaling transport layer notifies the S1AP layer of disconnection of signaling, the MME changes the state of the UE which has used the corresponding signaling connection to ECM-IDLE state. And the eNB releases RRC connection of the corresponding UE.

The S1 user plane interface (S1-U) is defined between eNB and S-GW. The S1-U interface provides non-guaranteed delivery of the user plane PDU between the eNB and the S-GW. The transport network layer is based on IP transmission, and the GPRS Tunneling Protocol User Plane (GTP-U) layer is used on top of the UDP/IP layer to deliver the user plane PDU between the eNB and the S-GW.

Figure 6:
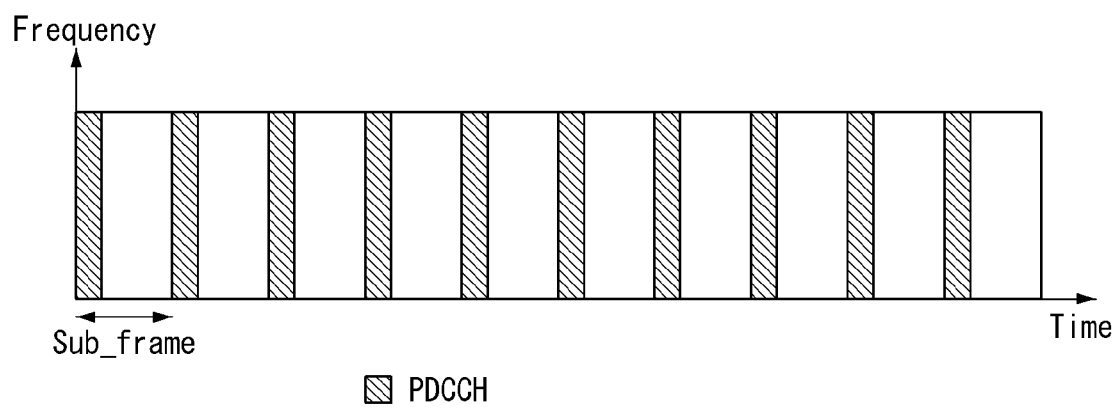
FIG. 6 illustrates a physical channel structure in a wireless communication system to which the present invention may be applied.

FIG. 6 illustrates a physical channel structure in a wireless communication system to which the present invention may be applied.

Referring to FIG. 6, a physical channel delivers signaling and data by using a radio resource comprising one or more subcarriers in the frequency domain and one or more symbols in the time domain.

One subframe having a length of 1.0 ms comprises a plurality of symbols. A specific symbol(s) of a subframe (for example, a first symbol of a subframe) may be used for a PDCCH. The PDCCH carries information about dynamically allocated resources (for example, resource block and MCS (Modulation and Coding Scheme)).

EMM and ECM State

In what follows, EPS Mobility Management (EMM) and EPS Connection Management (ECM) states will be described.

Figure 7:
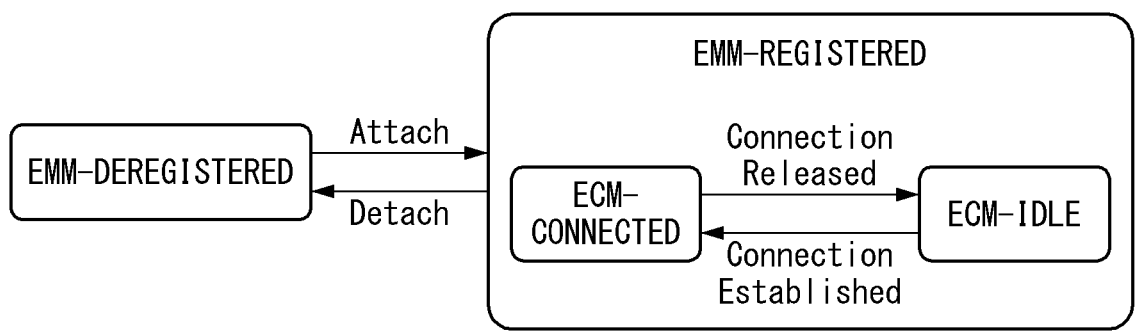
FIG. 7 illustrates an EMM and ECM states in a wireless communication system to which the present invention may be applied.

FIG. 7 illustrates an EMM and ECM states in a wireless communication system to which the present invention can be applied.

With reference to FIG. 7, to manage mobility of the UE in the NAS layer defined in the control planes of the UE and the MME, EMM-REGISTERED and EMM-DEREGISTERED states can be defined according to the UE is attached to or detached from a network. The EMM-REGISTERED and the EMM-DEREGISTERED states can be applied to the UE and the MME.

Initially, the UE stays in the EMM-DEREGISTERED state as when the UE is first powered on and performs registering to a network through an initial attach procedure to connect to the network. If the connection procedure is performed successfully, the UE and the MME makes transition to the EMM-REGISTERED state. Also, in case the UE is powered off or the UE fails to establish a radio link (namely, a packet error rate for a radio link exceeds a reference value), the UE is detached from the network and makes a transition to the EMM-DEREGISTERED state.

In addition, to manage signaling connection between the UE and the network, ECM-CONNECTED and ECM-IDLE states can be defined. The ECM-CONNECTED and ECM-IDLE states can also be applied to the UE and the MME. ECM connection consists of RRC connection formed between the UE and the eNB; and S1 signaling connection formed between the eNB and the MME. In other words, establishing/releasing an ECM connection indicates that both of the RRC connection and S1 signaling connection have been established/released.

The RRC state indicates whether the RRC layer of the UE is logically connected to the RRC layer of the eNB. In other words, in case the RRC layer of the UE is connected to the RRC layer of the eNB, the UE stays in the RRC_CON- NECTED state. If the RRC layer of the UE is not connected to the RRC layer of the eNB, the UE stays in the RRC_IDLE state.

The network can identify the UE staying in the ECM-CONNECTED state at the level of cell unit and can control the UE in an effective manner.

On the other hand, the network is unable to know the existence of the UE staying in the ECM-IDLE state, and a Core Network (CN) manages the UE on the basis of a tracking area unit which is an area unit larger than the cell. While the UE stays in the ECM-IDLE state, the UE performs Discontinuous Reception (DRX) that the NAS has configured by using the ID allocated uniquely in the tracking area. In other words, the UE can receive a broadcast signal of system information and paging information by monitoring a paging signal at a specific paging occasion for each UE-specific paging DRX cycle.

When the UE is in the ECM-IDLE state, the network does not carry context information of the UE. Therefore, the UE staying in the ECM-IDLE state can perform a mobility-related procedure based on the UE such as cell selection or cell reselection without necessarily following an order of the network. In case the location of the UE differs from the location recognized by the network while the UE is in the ECM-IDLE state, the UE can inform the network of the corresponding location of the UE through a Tracking Area Update (TAU) procedure.

On the other hand, when the UE is in the ECM-CONNECTED state, mobility of the UE is managed by an order of the network. While the UE stays in the ECM-CONNECTED state, the network knows to which cell the UE currently belongs. Therefore, the network can transit and/or receiver data to or from the UE, control mobility of the UE such as handover, and perform cell measurement with respect to neighboring cells.

As described above, the UE has to make a transition to the ECM-CONNECTED state in order to receive a general mobile communication service such as a voice or data communication service. As when the UE is first powered on, the UE in its initial state stays in the ECM-IDLE state as in the EMM state, and if the UE successfully registers to the corresponding network through an initial attach procedure, the UE and the MEE make a transition to the ECM connection state. Also, in case the UE has already registered to the network but radio resources are not allocated as traffic is not activated, the UE stays in the ECM-IDLE state, and if new uplink or downlink traffic is generated for the corresponding UE, the UE and the MME make a transition to the ECM-CONNECTED state through a Service Request procedure.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

The case in which a UE performs initial access in an RRC idle state in the absence of an RRC connection to an eNB The case in which a UE performs an RRC connection re-establishment procedure The case in which a UE connects to a target cell for the first time while performing a handover procedure The case in which a random access procedure is requested by a command from an eNB The case in which downlink data are generated while uplink synchronization is not met in the RRC connected state The case in which uplink data are generated while uplink synchronization is not met in the RRC connected state or a designated radio resource used for requesting a radio resource is not allocated The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

The UE on which a carrier aggregation is configured performs the random access procedure in case that the random access procedure previously described is required in connection with PCell. In case of TAG (that is, primary TAG (pTAG)) to which PCell belongs, the TA, which is determined based on PCell same as the existing case, or regulated through the random access procedure that accompanies PCell, can be applied to all the cells within the pTAG.

Meanwhile, in case of TAG (that is, secondary TAG (sTAG)) that is configured with SCells only, the TA, which is determined based on a specific SCell within sTAG, can be applied to all the cells within the corresponding sTAG, and in this time, the TA may be acquired through the random access procedure by being initiated by the eNB. Particularly, the SCell in the sTAG is set to be a (Random Access Channel) RACH resource, and the eNB requests a RACH access in SCell for determining TA. That is, the eNB initiates the RACH transmission on the SCells by PDCCH order that is transmitted from PCell. The response message for the SCell preamble is transmitted through PCell by using RA-RNTI. The TA that is determined based on SCell that successfully completes the random access can be applied to all the cells in the corresponding sTAG by the UE. Like this, the random access procedure may be performed in SCell as well in order to acquire timing alignment of the sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, a normal uplink/downlink transmission occurs.

Meanwhile, a relay node (RN) also support both of the contention based random access procedure and the non-contention based random access procedure. When a relay node performs the random access procedure, RN subframe configuration is suspended. That is, this means that the RN subframe configuration is temporarily discarded. Thereafter, the RN subframe structure is resumed at the time when the random access procedure is successfully completed.

Figure 8:
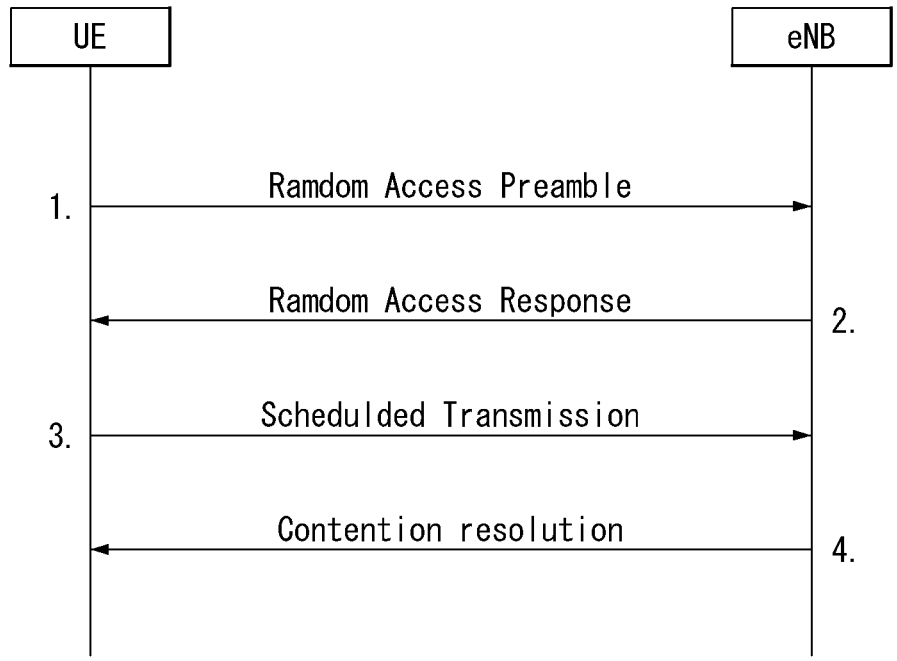
FIG. 8 illustrates a contention-based random access procedure in a wireless communication system to which the present invention may be applied.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the random access response. A random access response may include an RA preamble index/identifier, UL grant indicating a uplink radio resource, Temporary Cell RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command) used for transmitting a scheduling message (Msg 3) described later. The TPC is used to determine the transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The random access response information may be transmitted in the form of a MAC PDU (MAC Packet Data Unit) and the MAC PDU may be transmit through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble delimiter/identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, an RRC Connection request generated at the RRC layer and transmitted through a CCCH may be included in the Msg 3 and transmitted. And in the case of an RRC Connection Re-establishment procedure, an RRC Connection Re-establishment request generated at the RRC layer and transmitted through the CCCH may be included in the Msg 3 and transmitted. Also, a NAS connection request message may be included in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S(SAE)-TMSI or a random number). In most cases, the unique identity is longer than the C-RNTI.

The UE uses UE-specific scrambling for transmission on UL-SCH. In case the UE has received a C-RNTI, the UE may perform scrambling by using the C-RNTI. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits a Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. As one example, the Msg 4 may include an RRC Connection Setup message.

After transmitting data including an identity through a UL grant included in the random access response, the UE waits for a command from the eNB to resolve contention. In other words, two methods are available for a method for receiving the PDCCH, too. As described above, in case the identity in the Msg 3 transmitted in response to the UL grant is the C-RNTI, the UE attempts to receive the PDCCH by using its C-RNTI. In case the identity is a unique identity (in other words, 5-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data includes a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including an upper identity (S-TMSI or a random number) higher than a cell identity in the data according to the UL grant information included in a random access response and operates a contention resolution timer. In case the data including the upper identity of the UE is transmitted to a DL-SCH before the contention resolution timer expires, the UE determines that the random access process has been performed successfully. On the other hand, in case the data including the upper identity of the UE is not transmitted to the DL-SCH before the contention resolution data expires, the UE determines that the random access process has failed.

Figure 11:
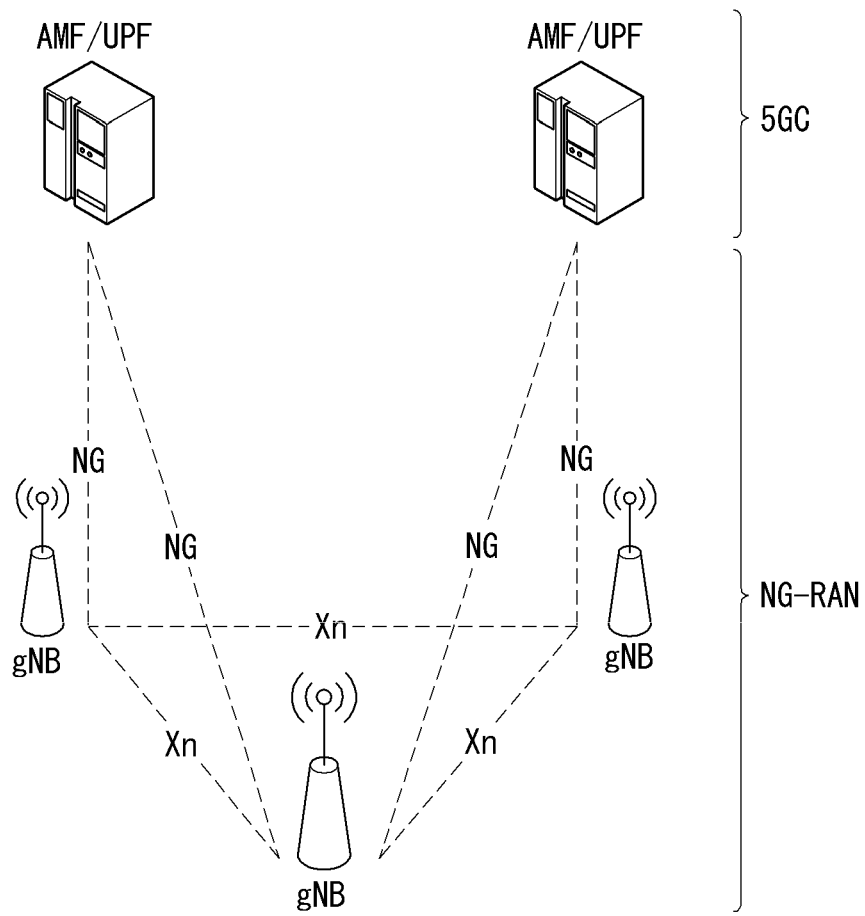
FIG. 11 illustrates an NG-RAN architecture to which the present invention may be applied.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

5G System Architecture to which the Present Invention May be Applied

A 5G system is a technology advanced from the 4$^{th}$ generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 9): indicates an interaction between NF services within NFs described by a point-to-point reference point (e.g., N11) between two NFs (e.g., AMF and SMF).

Service-based representation (FIG. 10): network functions (e.g., AMFs) within a control plane (CP) permit other authenticated network functions to access its own service. If this representation is necessary, it also includes a point-to-point reference point.

Figure 9:
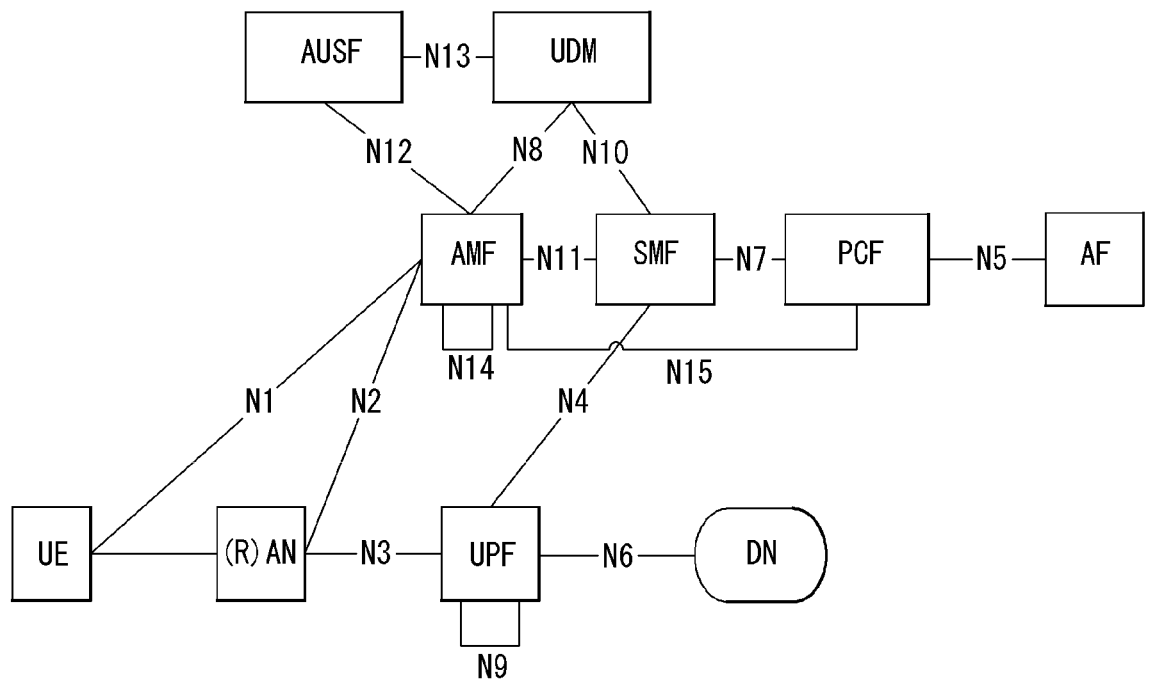
FIG. 9 illustrates a 5G system architecture using reference point representation.

FIG. 9 is a diagram illustrating 5G system architecture using a reference point representation.

Referring to FIG. 9, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF (SMS(Short Message Service) function), a security anchor function (SEA) and/or security context management (SCM).

Some or all of the functions of the AMF may be supported within a single instance of one AMF.

DN means an operator service, Internet access or a 3$^{rd}$ party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

AF interoperates with a 3GPP core network in order to provide services (e.g., support functions, such as an application influence on traffic routing, network capability exposure access, an interaction with a policy framework for policy control).

(R)AN collectively refers to a new radio access network supporting all of evolved E-UTRA (E-UTRA) and new radio (NR) access technologies (e.g., gNB), that is, an advanced version of the 4G radio access technology.

The network node in charge of transmission/reception of wireless signals with the UE is the gNB, and plays the same role as the eNB.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a $3^{rd}$ party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

In the 5G system, a node which is responsible for wireless transmission/reception with the UE is gNB and plays the same role as the eNB in the EPS. When the UE is simultaneously connected to the 3GPP connection and the non-3GPP connection, the UE receives a service through one AMF as illustrated in FIG. 9. In FIG. 9, it is illustrated that a connection is made by the non-3GPP connection and a connection is made by the 3GPP connection are connected to one same UPF, but the connection is not particularly required and may be connected by a plurality of different UPFs.

However, when the UE selects N3IWK (also referred to as non-3GPP interworking function (N3IWF)) in the HPLMN in the roaming scenario and is connected to the non-3GPP connection, the AMF that manages the 3GPP connection may be located in the VPLMN and the AMF that manages the non-3GPP connection may be located in the HPLMN.

The non-3GPP access network is connected to the 5G core network via N3IWK/N3IWF. The N3IWK/N3IWF interfaces the 5G core network control plane function and user plane function via the N2 and N3 interfaces, respectively.

A representative example of the non-3GPP connection mentioned in the present specification may be a WLAN connection.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session, which can be independently activated per PDU.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario N16: a reference point between two SMFs (in the case of a roaming scenario, a reference point between an SMF within a visited network and an SMF within a home network)

N17: a reference point between an AMF and an EIR

N18: a reference point between any NF and an UDSF

N19: a reference point between an NEF and an SDSF

Figure 10:
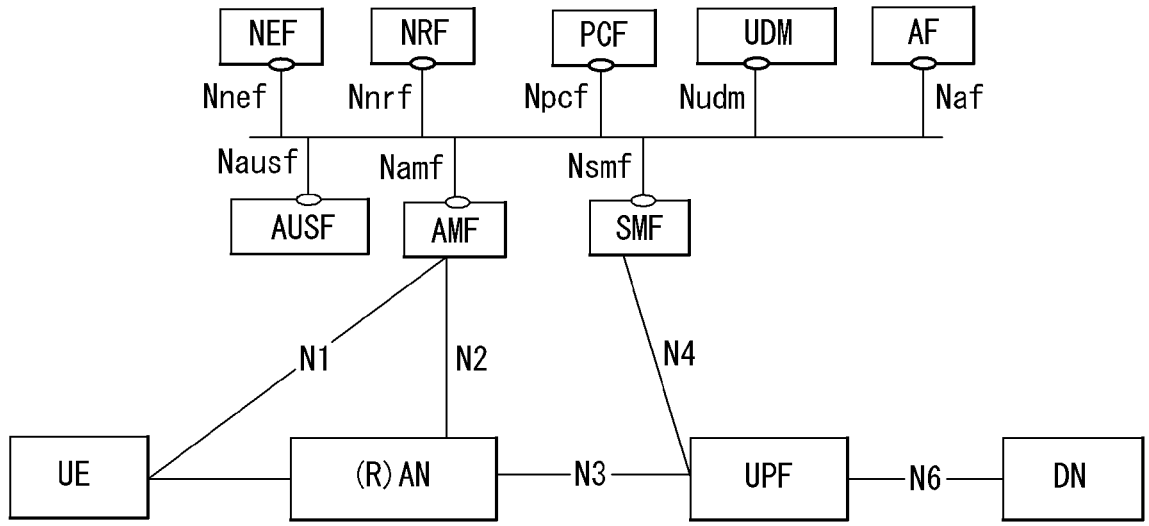
FIG. 10 illustrates a 5G system architecture using a service-based representation.

FIG. 10 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 11 illustrates NG-RAN architecture to which the present invention may be applied.

Referring to FIG. 11, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

Figure 12:
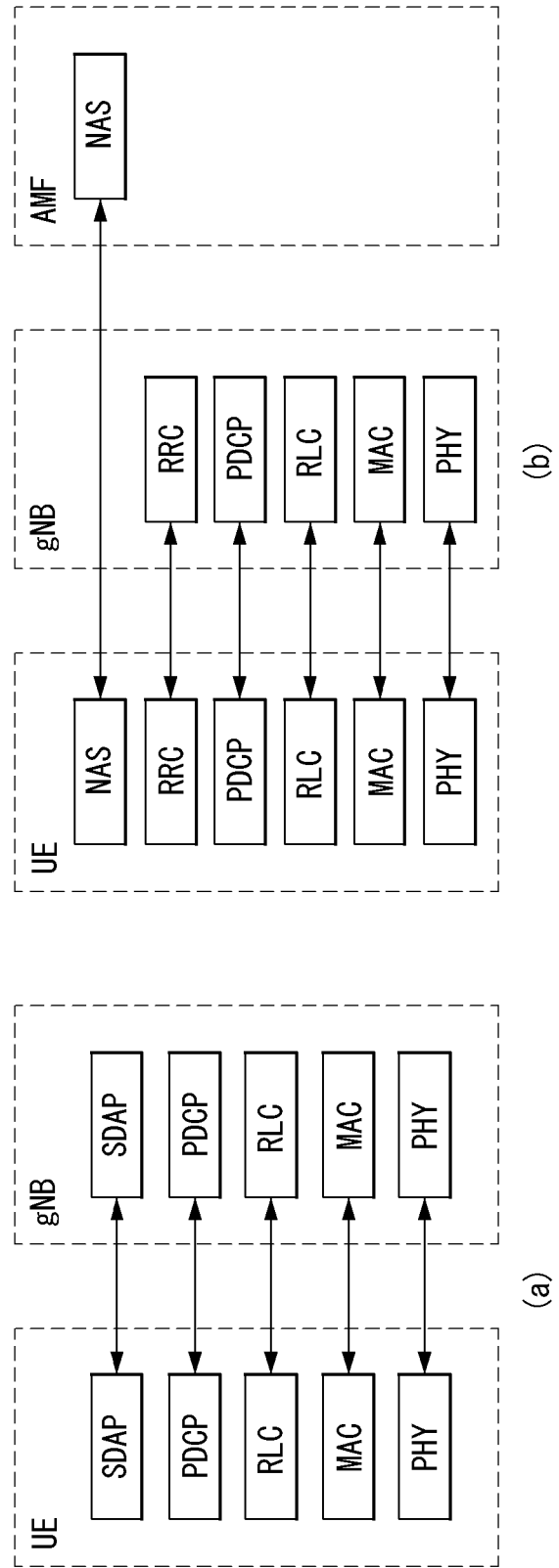
FIG. 12 illustrates a wireless protocol stack to which the present invention may be applied.

FIG. 12 is a diagram illustrating a radio protocol stack to which the present invention may be applied. Specifically, FIG. 12(a) illustrates a radio interface user plane protocol stack between a UE and a gNB, and FIG. 12(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 12(a), the user plane protocol stack may be divided into a first layer (Layer 1) (i.e., a physical layer (PHY) layer) and a second layer (Layer 2).

Referring to FIG. 12(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DR B) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP, error correction through an automatic repeat request (ARW), segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Figure 13:
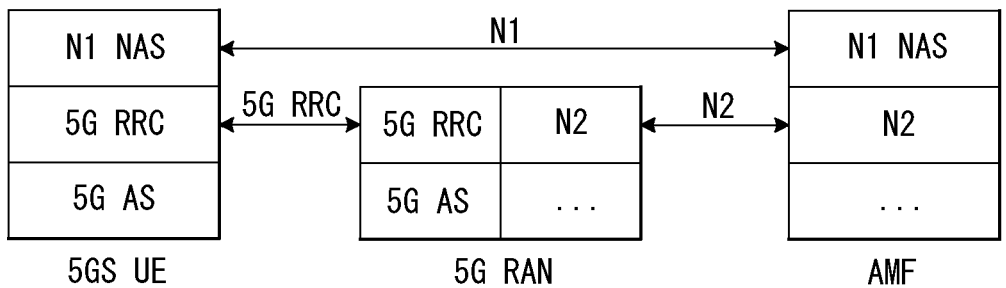
FIG. 13 illustrates a UE-to-core network protocol stack of a 5G/NR system to which the present invention may be applied.

FIG. 13 illustrates a UE-to-core network protocol stack of a 5G/NR system to which the present invention may be applied.

N1 may perform a similar role to an NAS protocol of an EPS and N2 may perform a similar role to S1-AP of the EPS. The 5G RRC and 5G AS correspond to the LTE RRC and the LTE AS in the related art, respectively or the NR RRC and NR AS of the newly standardized NR, respectively and both RATs are expected to be based on the current LTE RRC.

Network Slicing

The 5G system introduces network slicing technology that provides network resources and network functions as independent slices according to each service.

A network slice is a complete logical network that contains a set of network functions and corresponding resources required for providing specific network functions and network characteristics. The network slice includes both 5G-AN and 5G CN. A Network Slice Instance (NSI) means an instantiation of a network slice, i.e., a set of deployed network functions that deliver the intended network slice service according to a network slice template.

As the network slicing is introduced, isolation and independent management of network functions and network resources may be provided for each slice. As a result, the network functions of the 5G system are selected and combined according to a service, a user, etc., to provide an independent and more flexible for each service and each user.

The network slice refers to a network that logically integrates an access network and a core network.

The network slice may include one or more of the following:

Core Network Control Plane and User Plane Functions

NG-RAN

Non-3GPP interworking function (N3IWF) to non-3GPP access network

Supported functions and network function optimizations may be different for each network slice. Multiple network slice instances (NSIs) may provide the same function to groups of different UEs.

One UE may be simultaneously connected to one or more network slice instances via 5G-AN. One UE may be serviced simultaneously by up to eight network slices. The AMF instance serving the UE may belong to each network slice instance serving the UE. That is, the AMF instance may be common to the network slice instance serving the UE. The CN portion of the network slice instance(s) serving the UE is selected by the CN.

The AMF discovery and selection for the set of slices for the UE is triggered by the first contacted AMF in the registration procedure, which may lead to a change in the AMF. The SMF discovery and selection are initiated by the AMF when an SM message for establishing a PDU session is received from the UE. An NRF is used for assisting discovery and selection operations.

One PDU session belongs to only one network slice instance specific to each PLMN. Different network slice instances do not share a single PDU session.

One PDU session belongs to one network slice instance specific to each PLMN. Different slices may have slice-specific PDU sessions using the same Data Network Name (DNN), but different network slice instances do not share one PDU session.

Single Network Slice Selection Assistance information (S-NSSAI) identifies the network slice. Each S-NSSAI is supplementary information used by the network to select a specific network slice instance. The NSSAI is a set of S-NSSAI(s). The S-NSSAI includes:

Slice/Service type (SST): The SST represents the operation of the network slice expected in terms of the function and the service.

Slice Differentiator (SD): The SD is optional information that complements the SST(s) for selecting the network slice instance from a plurality of potential network slice instances that comply with all of the indicated SSTs.

The S-NSSAI may have a standard value or a PLMN-specific value. The S-NSSAI with the PLMN-specific value is associated with the PLMN ID of the PLMN that assigns the PLMN-specific value. The S-NSSAI shall not be used by the UE in an access stratum procedure other than the PLMN associated with the S-NSSAI.

1) Selecting Network Slice on Initial Connection

The UE may be configured with configured NSSAI by the home PLMN (HPLMN) for each PLMN. The configured NSSAI is PLMN-specified, and the HPLMN indicates the PLMN(s) to which each configured NSSAI is applied.

Upon initial connection of the UE, the RAN selects an initial network slice to carry the message by using the NSSAI. To this end, in the registration procedure, the UE provides a requested NSSAI (NSSAI) to the network. At this time, when the UE provides the requested NSSAI to the network, the UE in a predetermined PLMN uses only S-NSSAIs belonging to the configured NSSAI of the PLMN.

If the UE does not provide the NSSAI to the RAN or the RAN fails to select an appropriate network slice according to the provided NSSAI, the RAN may select a default network slice.

The subscription data includes the S-NSSAI(s) of the network slice(s) to which the UE is subscribed. One or more S-NSSAI(s) may be marked as a default S-NSSAI. When the S-NSSAI is marked by default, the network may serve the UE with the associated network slice, even if the UE does not send any S-NSSAI to the network within the registration request. The UE subscription data may include a default DNN for a given S-NSSAI. The NSSAI provided by the UE in the registration request is verified for the subscription data of the user.

When the UE is successfully registered, the CN informs the (R)AN by providing the entire allowed NSSAI (including one or more S-NSSAIs). Further, when the registration procedure of the UE is successfully completed, the UE may obtain the allowed NSSAI for the PLMN from the AMF.

The allowed NSSAI takes precedence over the configured NSSAI for the PLMN. The UE then uses only the S-NSSAI(s) in the allowed NSSAI corresponding to the network slice for a network slice selection related procedure in the serving PLMN.

For each PLMN, the UE stores the Configured NSSAI and Allowed NSSAI (if present). When the UE receives the Allowed NSSAI for the PLMN, the UE overrides the previously stored Allowed NSSAI for the PLMN.

2) Slice Change

The network may change the network slice instance already selected according to a local policy, mobility of the UE, change of subscription information, and the like. That is, the set of network slices of the UE may be changed at any time while the UE is registered in the network. In addition, the change of the set of network slices of the UE may be initiated by the UE under the network or under a specific condition.

Based on the local policy, the change of the subscription information, and/or the mobility of the UE, the network may change the set of allowed network slice(s) in which the UE is registered. The network may perform the change during the registration procedure, or may inform the UE of a change in the supported network slice(s) using a procedure that may trigger the registration procedure.

When changing the network slice, the network may provide the UE with a new Allowed NSSAI and Tracking Area list. The UE transmits signaling depending on a mobility management procedure including a new NSSAI to cause reselection of the slice instance. As the slice instance is changed, the AMF that supports the change of the slice instance may also be changed.

When the UE enters an area where the network slice is no longer available, the core network releases the PDU session for the S-NSSAI corresponding to the network slice that is no longer available through the PDU session release procedure.

When a PDU session corresponding to a slice that is no longer available is released, the UE uses the UE policy to determine whether existing traffic may be routed through a PDU session belonging to another slice.

For changing the set of S-NSSAI (s) used, the UE initiates the registration procedure.

3) SMF Selection

The PCF provides a Network Slice Selection Policy (NSSP) to the UE. The NSSP is used by the UE to associate the UE with the S-NSSAI and to determine the PDU session to which traffic will be routed.

The network slice selection policy is provided for each application of the UE, and includes a rule for mapping the S-NSSAI for each UE application. The AMF selects the SMF for PDU session management by using the subscriber information, a local operator policy, etc., together with SM-NSSAI and DNN information delivered by the UE.

When a PDU session for a specific slice instance is established, the CN provides the (R)AN with the S-NSSAI corresponding to the slice instance to which the PDU session belongs, so that the RAN may access the specific function of the slice instance.

4) UE NSSAI Configuration and NSSAI Storage Area (Aspect)

The UE may be configured with the NSSAI by the HPLMN. The NSSAI is defined as the configured NSSAI. The configured NSSAI may be PLMN-specified unless the configured NSSAI is configured only by standard S-NSSAI values. The PLMN ID of the configured-NSSAI need not be specified if the PLMN ID is applied to all PLMNs which the UE may roam. The UE may be configured with the NSSAI by some PLMNs.

When the registration procedure of the UE is successfully completed, the UE may acquire the NSSAI from the AMF, and the NSSAI may include one or more S-NSSAIs to be used by the UE for subsequent slice selection related procedures. This is referred to as approved NSSAI.

The UE needs to store the NSSAI approved for each PLMN. The UE should use the approved NSSAI when returning to the PLMN.

5) Detailed Operation Overview

When the UE is registered in the PLMN, the UE, if stored in the UE, should provide the configured NSSAI, the approved NSSAI, or a subset thereof in the network of the RRC and NAS layers.

It may be determined whether the NSSAIs of the RRC and the NAS are exactly the same. The NSSAI is used to select the AMF, while the S-NSSAI is used to help select the network slice instances.

The UE needs to store the NSSAI configured and/or approved for each PLMN.

- When the configured NSSAI is configured in the UE by the HPLMN to be used in the PLMN when the PLMN-specific approved NSSAI is not stored in the UE.
- The approved NSSAI is the NSSAI provided to the UE by the PLMN in the registration procedure, and the UE should use the NSSAI in the PLMN until the next registration from the PLMN. The registration approval message may include the approved NSSAI. The approved NSSAI may be updated by subsequent registration procedures.

If the UE is provided with the NSSAI configured for the selected PLMN, the UE should encapsulate the NSSAI in the RRC connection establishment and the NAS. The RAN routes an initial access to the AMF by using the provided NSSAI.

If the UE does not yet receive any accepted NSSAI for the selected PLMN, but the UE is provided with the NSSAI configured for the selected PLMN, the UE may provide the NSSAI or a subset set configured in an RRC connection establishment. The RAN uses the NSSAI to route the initial access to the AMF.

When the UE does not provide any NSSAI (approved or configured) for the PLMN selected in the RRC connection establishment and the NAS, the RAN transmits the NAS signaling to a default AMF.

If registration is successful, the UE is provided with a Globally Unique Temporary UE Identity (GUTI) by the serving AMF. The UE encapsulates a local unique temporary ID in the RRC connection establishment during subsequent initial access, so that one RAN may route the NAS message to the appropriate AMF as long as the Temp ID is valid. Further, the serving PLMN may return recently approved NSSAIs of sliced allowed by the serving PLMN for the UE. The approved NSSAI includes S-NSSAI values of the slices allowed by the serving PLMN of the UE.

When receiving the NSSAI and a fully local unique temporary ID at the RRC, if the may reach the AMF corresponding to the local unique temporary ID, the RAN delivers the request to the AMF. Otherwise, the RAN selects the appropriate AMF based on the NSSAI provided by the UE and transmits the request to the selected AMF. If the RAN may not select the AMF based on the provided NSSAI, the request is transmitted to the default AMF.

The network operator may provide a network slice selection policy (NSSP) to the UE. The NSSPs contain one or more NSSP rules, each of which associates one application with a specific S-NSSAI. The NSSP may also include a basic rule to match all applications with the S-NSSAI. When the UE application associated with the specific S-NSSAI requests data transmission:

- When the UE has one or more PDU sessions established by the specific S-NSSAI, unless other conditions of the UE prohibit the use of the PDU session, the UE routes user data of the application in one of the corresponding PDU sessions. When the application provides the DNN, the UE determines the PDU session to be used by considering the DNN.

If the UE does not have a PDU session established with the specific S-NSSAI, the UE requests a new PDU session with the S-NSSAI and the DNN that may be provided by the application. In order for the RAN to select an appropriate resource to support network slicing in the RAN, the RAN needs to recognize the network slice used by the UE.

Based on the local policy, the subscription change, and/or the UE mobility, the network may change the set of network slices used by the UE by providing the UE with an approved NSSAI change notification indicating a new value of the NSSAI. This triggers a UE-initiated re-registration procedure that includes the value of the new NSSAI provided by the network for RRC and NAS signaling.

The change (whether the UE or network is initiated) of the slice set used by the UE may cause the AMF change according to the operator policy.

When the network slice set which may be accessed by the UE is changed, if the slice is not used any longer (if some slices are potentially maintained), a set of original network slices and an ongoing PDU session are terminated.

During the initial registration procedure, if the network determines that the UE should be served by another AMF, the AMF that first receives the initial registration request may forward the initial registration request to another AMF through the RAN or through direct signaling between the initial AMF and the target AMF. The redirect message transmitted by the AMF via the RAN should contain information on the new AMF to serve the UE.

For a UE already registered, the system should support redirection initiated from the serving AMF to the target AMF by the network of the UE.

- The operator policy determines whether redirection between the AMFs is allowed.
- If the network determines to redirect the UE due to the change of the NSSAI, the network transmits an updated/new NSSAI to the UE using the RM procedure and instructs the UE to start the registration update procedure with the updated/new NSSAI. The UE initiates a registration update procedure with the updated/new NSSAI.

The AMF selects the SMF from the network slice instance based on the S-NSSAI, DNN, and other information (e.g., UE subscription and local operator policy). The selected SMF establishes the PDU session based on the S-NSSAI and the DNN.

In roaming scenarios, network slice specific network functions of VPLMN and HPLMN are selected as follows based on the S-NSSAI provided by the UE during the PDU connection establishment:

When a standardized S-NSSAI is used, selection of slice specific NF instances is performed by each PLMN based on the provided S-NSSAI.

Otherwise, VPLMN maps the S-NSSAI of the HPLMN to the S-NSSAI of the VPLMN based on a roaming agreement (including the mapping to a default S-NSSAI of the VPLMN). The selection of slice specific NF instances in the VPLMN is based on the S-NSSAI of the VPLMN, and the selection of slice specific NF instances of the HPLMN is based on the S-NSSAI of the HPLMN.

Session Management

The 5GC supports the PDU Connectivity Service, i.e., a service for providing exchange of the PDU(s) between the UE and the DN identified by a data network name (DNN) (or Access Point Name (APN). The PDU connectivity service is supported through the PDU session established upon request from the UE.

Each PDU session supports a single PDU session type. That is, when the PDU session is established, the PDU session supports the exchange of a single type of PDU requested by the UE in establishing the PDU session. The following PDU session type is defined. IP version4 (IPv4), IP version6 (IPv6), Ethernet, and unstructured. Here, the type of PDU exchanged between the UE and the DN is completely transparent in the 5G system.

The PDU session is established (on UE request), modified (on UE and 5GC request), and released (on UE and 5GC request) using NAS SM signaling exchanged over N1 between the UE and SMF. Upon request from the application server, the 5GC may trigger a specific application in the UE. When the UE receives the trigger message, the UE forwards the message to the identified application and the identified application may establish the PDU session with a specific DNN.

The SMF checks whether the UE request conforms to user subscription information. To this end, the SMF obtains SMF level subscription data from the UDM. The data may indicate a PDU session type allowed for each DNN.

The UE registered through multiple accesses selects an access for establishing the PDU session.

The UE may request to move the PDU session between 3GPP access and non-3GPP access. Determination to move the PDU session between the 3GPP and the non-3GPP access is made for each PDU session. That is, the UE may have the PDU session using the 3GPP access while another PDU session uses the non-3GPP access.

In the PDU session establishment request, the UE provides a PDU session identity (Id). The UE may also provide the PDU session type, slicing information, DNN, and a service and session continuity (SSC) mode.

The UE may simultaneously establish multiple PDU sessions by the same DN or by different DNs via the 3GPP access and/or non-3GPP access.

The UE may establish the multiple PDU session by the same DN served by different UPF end N6.

The UE that has multiple established PDU sessions may be served by different SMFs.

User plane paths of different PDU sessions which belong to the same UE (by the same or different DNN) may be completely separated between the UPF and the AN interfacing with the DN.

The 5G system architecture supports session and service continuity (SCC), which may meet various continuity requirements of different applications/services in the UE. The 5G systems support different SSC modes. The SSC mode associated with the PDU session anchor is not changed while the PDU session is established.

For PDU sessions to which SSC mode 1 is applied, the network maintains the continuity service provided to the UE. For PDU sessions of IP type, the IP address is maintained.

When SSC mode 2 is used, the network may release the continuity service delivered to the UE and may also release the corresponding PDU session. In the case of the IP type PDU session, the network may release the IP address(es) assigned to the UE.

When SSC mode 3 is used, the change to the user plane may be known to the UE, but the network ensures that the UE does not lose connectivity. To allow better service continuity, a connection is established through a new PDU session anchor point before the previous connection is terminated. For the IP type PDU session, the IP address is not maintained during anchor relocation.

An SSC mode selection policy is used to determine the type of SSC mode associated with the application (or group of applications) of the UE. The operator may pre-configure the SSC mode selection policy to the UE. The policy includes one or more SSC mode selection policy rules which may be used for determining the type of SSC mode associated with the application (or application group). In addition, the policy may include a default SSC mode selection policy rule that may be applied to all applications of the UE.

If the UE provides the SSC mode when requesting the new PDU session, the SMF chooses whether to accept the requested SSC mode or to modify the requested SSC mode based on subscription information and/or local configuration. If the UE does not provide the SSC mode when requesting the new PDU session, the SMF selects the default SSC mode for the data network listed in the subscription information or applies the local configuration for selecting the SSC mode.

The SMF informs the UE of the SSC mode selected for the PDU session.

Mobility Management

Registration Management (RM) is used to register or de-register the UE/user in or from the network and to establish a user context in the network.

1) Registration Management

The UE/user needs to be registered in the network in order to receive a service for requesting registration. Once registered, the UE may, if applicable, update registration thereof in the network in order to periodically maintains reachability (periodic registration update), on the move (mobility registration update), in order to update a capability thereof or renegotiates protocol parameters.

The initial registration procedure includes the execution of a network access control function (i.e., user authentication and access authentication based on a subscription profile in the UDM). As a result of the registration procedure, an identifier of the serving AMF is registered in the UDM.

Figure 14:
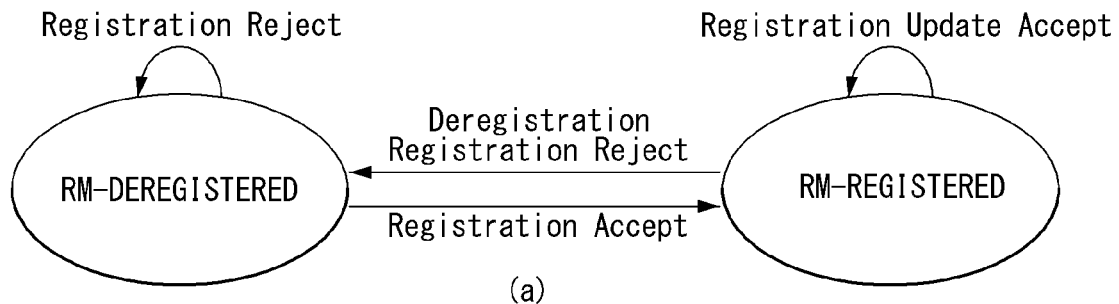
FIG. 14 illustrates a RM state model to which the present invention may be applied.
Figure 14:
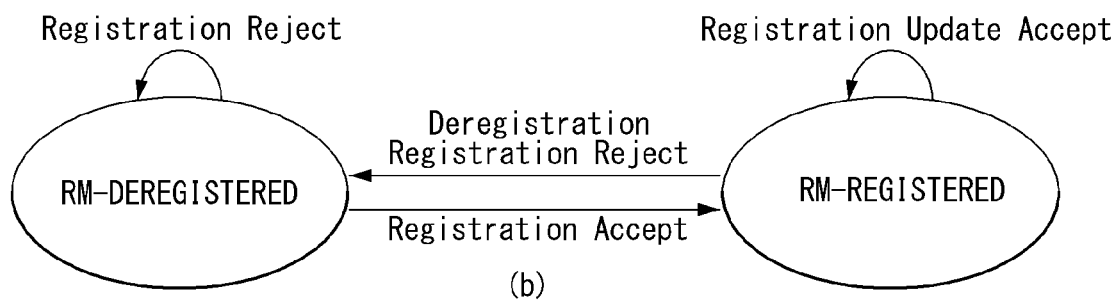

FIG. 14 illustrates an RM state model to which the present invention may be applied. In particular, FIG. 14(a) illustrates the RM state model in the UE and FIG. 14(b) illustrates the RM state model in the AMF.

Referring to FIG. 14, two RM states, i.e. RM-DEREGISTERED and RM-REGISTERED are used in the UE and the AMF to reflect the registration state of the UE in the selected PLMN.

In the RM DEREGISTERED state, the UE is not registered in the network. The UE context in AMF does not maintain a valid location or routing information for the UE and therefore the UE is not reachable by the AMF. However, for example, in order to prevent the authentication procedure from being performed during every registration procedure, some UE contexts may still be stored in the UE and the AMF.

In the RM DEREGISTERED state, if the UE needs to receive the service requiring registration, the UE attempts to register in the selected PLMN using the initial registration procedure. Alternatively, when receiving a registration reject upon the initial registration, the UE remains in the RM-DEREGISTERED state. On the other hand, when receiving a Registration Accept, the UE enters the RM-REGISTERED state.

In the RM DEREGISTERED state, when applicable, the AMF approves the initial registration of the UE by transmitting the Registration Accept to the UE and enters the RM-REGISTERED state. Alternatively, when applicable, the initial registration of the UE is rejected by transmitting the Registration Reject to the UE.

In the RM-REGISTERED state, the UE is registered in the network. In the RM-REGISTERED state, the UE may receive the service requesting the registration in the network.

In the RM-REGISTERED state, if the Tracking Area Identity (TAI) of the current serving cell is not in the list of TAIs that the UE receives from the network, the UE performs a mobility Registration Update procedure so as to maintain the registration of the UE and for the AMF to perform paging to the UE. Alternatively, in order to inform the network that the UE is still active, the UE performs a periodic Registration Update procedure triggered by the expiration of a periodic update timer. Alternatively, in order to update capability information of the UE or renegotiate the protocol parameter with the network, the UE performs the Registration Update procedure. Alternatively, when the UE no longer needs to be registered in the PLMN, the UE performs the deregistration procedure and enters the RM-DEREGISTERED state. The UE may decide the deregistration from the network at any time. Alternatively, the UE enters the RM-DEREGISTERED state when receiving the Registration Reject message and the Deregistration message or when performing the local deregistration procedure without initiating any signaling.

In the RM-REGISTERED state, when the UE no longer needs to be registered in the PLMN, the AMF performs the deregistration procedure and enters the RM-DEREGISTERED state. The AMF may determine the deregistration of the UE at any time. Alternatively, after an Implicit Deregistration timer expires, the AMF performs Implicit Deregistration at any time. The AMF enters the RM-DEREGISTERED state after the implicit deregistration. Alternatively, the AMF performs local deregistration for the UE negotiated to perform deregistration at the end of the communication. The AMF enters the RM-DEREGISTERED state after the local deregistration. Alternatively, when applicable, the AMF approves or rejects Registration Update from the UE. When the AMF rejects the Registration Update from the UE, the AMF may reject the UE registration.

Registration area management includes a function to assign and reassign a registration area to the UE. The registration area is managed for each access type (i.e., 3GPP access or non-3GPP access).

When the UE is registered in the network via the 3GPP access, the AMF assigns the UE a set of tracking area (TA)(s) in the TAI list. When the AMF allocates the registration area (i.e., a set of TAs in the TAI list), the AMF may consider various information (e.g., mobility patterns and allowed/non-allowed areas, etc.). An AMF having a whole PLMN (all PLMN) as a serving area may allocate the entire PLMN as the registration area to a UE in a MICO mode.

The 5G system supports the assignment of TAI lists containing different 5G-RAT(s) in a single TAI list.

When a UE is registered in the network via the non-3GPP access, the registration area for the non-3GPP access corresponds to a unique reserved TAI value (i.e., dedicated to the non-3GPP access). Thus, there is a unique TA for the non-3GPP access to 5GC, which is referred to as N3GPP TAI.

When generating a TAI list, the AMF encapsulates only the TAI(s) applicable to the access to which the TAI list is transmitted.

2) Connection Management

Connection Management (CM) is used to establish and release a signaling connection between the UE and the AMF. The CM includes the function of establishing and releasing a signaling connection between the UE and the AMF over N1. The signaling connection is used to enable NAS signaling exchange between the UE and the core network. The signaling connection includes both an AN signaling connection for the UE between the UE and the AN and an N2 connection for the UE between the AN and AMF.

Figure 15:
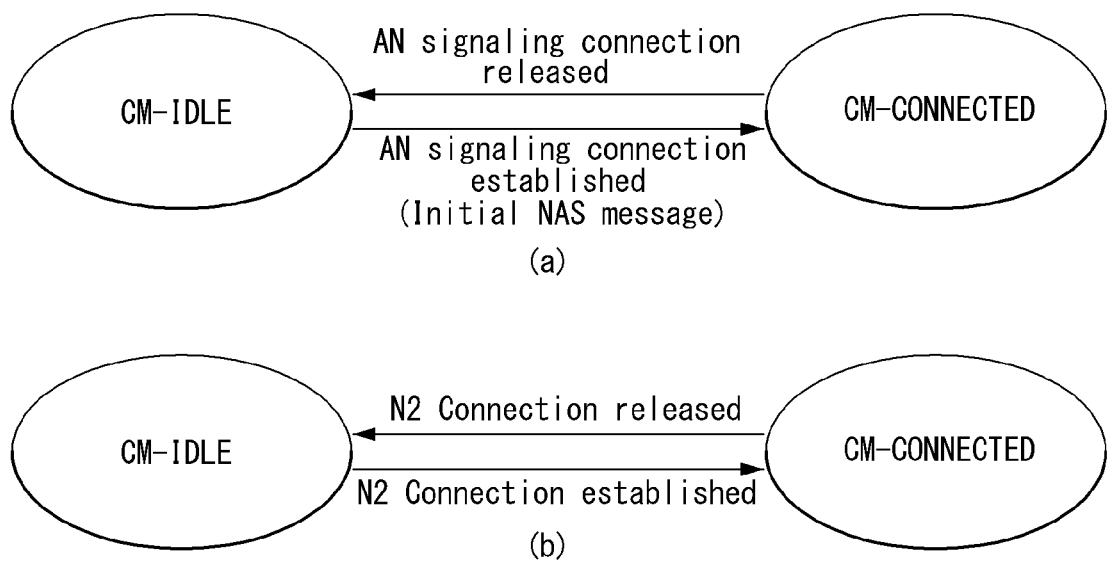
FIG. 15 illustrates a CM state model to which the present invention may be applied.

FIG. 15 illustrates a CM state model to which the present invention may be applied. In particular, FIG. 15(a) illustrates a CM state transition in the UE and FIG. 15(b) illustrates the CM state transition in the AMF.

Referring to FIG. 15, two CM states are used, CM-IDLE and CM-CONNECTED, to reflect the NAS signaling connection of the UE with the AMF.

he UE in the CM-IDLE state is in the RM-REGISTERED state and does not have an established NAS signaling connection with the AMF over N1. The UE performs cell selection, cell reselection, and PLMN selection.

There is no AN signaling connection, N2 connection, and N3 connection for the UE in the CM-IDLE state.

In the CM-IDLE state, the UE responds to paging (if received) by performing a service request procedure, unless in MICO mode. Alternatively, when the UE has uplink signaling or user data to be transmitted, the UE performs a service request procedure. Alternatively, whenever the AN signaling connection is established between the UE and the AN, the UE enters a CM-CONNECTED state. Alternatively, the transmission of the initial NAS message (Registration Request, Service Request, or Deregistration Request) initiates a transition from the CM-IDLE state to the CM-CONNECTED state.

In the CM-IDLE state, if the UE is not in the MICO mode, when the AMF has signaling or mobile-terminated data to be transmitted to the UE, a network triggered service request procedure triggered by the network is performed by transmitting a paging request to the UE. Each time an N2 connection is established between the AN and the AMF for the UE, the AMF enters the CM-CONNECTED state.

The UE in CM-CONNECTED state has the NAS signaling connection with the AMF through N1.

In the CM-CONNECTED state, whenever the AN signaling connection is released, the UE enters the CM-IDLE state.

In the CM-CONNECTED state, whenever the N2 signaling connection and the N3 connection for the UE are released, the AMF enters the CM-IDLE state.

When the NAS signaling procedure is completed, the AMF may determine to release the NAS signaling connection of the UE. When the AN signaling connection release is completed, the CM state in the UE is changed to CM-IDLE. When the N2 context release procedure is completed, the CM state for the UE in AMF is changed to CM-IDLE.

The AMF may keep the UE in the CM-CONNECTED state until the UE deregisters from the core network.

The UE in the CM-CONNECTED state may be in an RRC inactive state. When the UE is in the RRC Inactive state, the UE reachability is managed by the RAN using assistance information from the core network. In addition, when the UE is in the RRC Inactive state, UE paging is managed by the RAN. Further, when the UE is in the RRC Inactive state, the UE monitors paging using the CN and RAN identifiers of the UE.

The RRC Inactive state is applied to the NG-RAN (i.e., to NR and E-UTRA connected to the 5G CN).

Based on the network configuration, the AMF provides assistance information to the NG-RAN in order to assist the NG-RAN in determining whether to switch the UE to the RRC Inactive state.

The RRC Inactive assistance information includes a UE specific Discontinuous Reception (DRX) value for RAN paging during the RRC Inactive state and a registration area provided to the UE.

The CN assistance information is provided to the serving NG RAN node during N2 activation (i.e., during registration, service request, and path switch).

The states of the N2 and N3 reference points are not changed by the UE entering the CM-CONNECTED state involving RRC Inactive. The UE in the RRC Inactive state knows a RAN notification area.

When the UE is in the CM-CONNECTED state with RRC Inactive, the UE may resume the RRC connection due to an uplink data pending, a mobile initiated signaling procedure (i.e., periodic registration update), a response to RAN paging, or notification to the network that the UE is out of the RAN notification area.

If the UE resumes connectivity at different NG-RAN nodes in the same PLMN, the UE AS context is recovered from the old NG RAN node, and the procedure is triggered towards the CN.

When the UE is in the CM-CONNECTED state with RRC Inactive, the UE performs cell selection with GERAN/UTRAN/EPS and follows the idle mode procedure.

In addition, the UE in the CM-CONNECTED state with RRC Inactive enters the CM-IDLE mode and follows the relevant NAS procedure in the following cases.

Case where the RRC resume procedure is unsuccessful, and

Case where movement of the UE to the CM IDLE mode is required in a failure scenario which may be not solved in the RRC Inactive mode NAS signaling connection management includes a function to establish and release the NAS signaling connection.

The NAS signaling connection establishment function is provided by the UE and the AMF to establish the NAS signaling connection of the UE in the CM-IDLE state.

When the UE in the CM-IDLE state needs to transmit the NAS message, the UE initiates the service request or registration procedure to establish the signaling connection to the AMF.

Based on the UE's preferences, UE subscription information, UE mobility pattern and network settings, the AMF may maintain the NAS signaling connection until the UE deregisters from the network.

The procedure of the release of the NAS signaling connection is initiated by the 5G (R)AN node or AMF.

If the UE senses that the AN signaling connection is released, the UE determines that the NAS signaling connection is released. If the AMF senses that the N2 context is released, the AMF determines that the NAS signaling connection is released.

3) UE Mobility Restriction

The mobility restriction restricts service access or mobility control of the UE in the 5G system. A Mobility restriction function is provided by the UE, the RAN, and the core network.

The mobility restriction is applied only to the 3GPP access and not applied to the non-3GPP access.

In the CM-IDLE state and the CM-CONNECTED state involving RRC Inactive, the mobility restriction is performed by the UE based on the information received from the core network. In the CM-CONNECTED state, the mobility restriction is performed by the RAN and the core network.

In the CM-CONNECTED state, the core network provides the RAN with a Handover Restriction List for the mobility restriction.

The mobility restriction includes RAT restrictions, Forbidden areas, and service area restrictions as follows:

RAT restriction: The RAT restriction is defined as 3GPP RAT(s) in which the access of the UE is not allowed. The UE in the restricted RAT is not allowed to initiate any communication with the network based on the subscription information.

Forbidden area: In the forbidden area under predetermined RAT, the UE is not allowed to initiate any communication with the network based on the subscription information.

Service area restriction: Defines an area where the UE may initiate or not initiate communication with the network as follows.

Allowed area: Within the allowed area under the predetermined RAT, the UE is allowed to initiate communication with the network if allowed by the subscription information.

Non-allowed area: Within the unlicensed area under a given RAT, the UE is restricted in a service area thereof based on the subscription information. The UE and the network are not allowed to initiate session management signaling (both CM-IDLE and CM-CONNECTED states) for acquiring a service request or user service. The RM procedure of the UE is the same as in the allowed area. The UE in the non-allowed area responds to paging of the core network with the service request.

For a predetermined UE, the core network determines the service area restriction based on the UE subscription information. Optionally, the allowed area may be fine-tuned by the PCF (e.g., based on UE location, Permanent Equipment Identifier (PEI), network policy, etc.). The service area restriction may be changed due to, for example, subscription information, location, PEI and/or policy changes. The service area restriction may be updated during the registration procedure.

If the UE has an area overlapping between the RAT restriction, the prohibited area, the allowed area, the non-allowed area, or a combination thereof, the UE proceeds according to the following priorities:

The evaluation of the RAT restriction takes precedence over the evaluation of any other mobility restriction;

The evaluation of the prohibited area takes precedence over the evaluation of the allowed and non-allowed areas; and The evaluation of the non-allowed area takes precedence over the evaluation of the allowed area.

4) Mobile Initiated Connection Only (MICO) Mode

The UE may indicate a preference of the MICO mode during initial registration or registration update. The AMF determines whether the MICO mode is allowed to the UE based on the Local setting, preference indicated by the UE, UE subscription information and network policy, or a combination thereof, and informs the UE during the registration procedure.

The UE and the core network re-initiate or exit the MICO mode in the next registration signaling. If the MICO mode is not explicitly indicated within the registration procedure and the registration procedure is successfully completed, the UE and AMF do not use the MICO mode. That is, the UE operates as a general UE, and the network also treats the UE as a general UE.

The AMF allocates the registration area to the UE during the registration procedure. If the AMF instructs the UE in the MICO mode, the registration area is not restricted to a paging area size. If the AMF serving area is the entire PLMN, the AMF may provide the UE with an "All PLMN" registration area. In this case, re-registration with the same PLMN due to mobility is not applied. If the mobility restriction is applied to the UE in the MICO mode, the AMF assigns the allowed/non-allowed area to the UE.

If the AMF instructs the UE in the MICO mode, the AMF regards that it is always unreachable while the UE is in the CM-IDLE state. The AMF rejects any request for downlink data delivery for the UE in the MICO mode and the CM-IDLE state. The AMF also delays downlink transport, such as SMS, location services, etc. over the NAS. The UE in the MICO mode is accessible for mobile terminated data or signaling only when the UE is in the CM-CONNECTED mode.

The AMF may provide a Pending Data indication to the RAN node so that the UE in the MICO mode may immediately deliver the mobile terminated data and/or signaling when switching to the CM-CONNECTED mode. When the RAN node receives the indication, the RAN node considers the information when determining user inactivity.

The UE in MICO mode does not need to listen to the paging during the CM-IDLE state. The UE may abort any AS procedure within the CM-IDLE state until the UE in the MICO mode initiates the transition from CM-IDLE to CM-CONNECTED mode for one of the following reasons:

Case where the change (e.g., configuration change) in the UE requires the registration update to the network Case where the periodic registration timer expires Case where mobile originating (MO) data is pending Case where MO signaling is pending Quality of Service (QoS) Model QoS is a technology for smoothly delivering a service for various traffic (e-mail, data transmission, voice, and video) to users according to characteristics of the traffic.

A 5G QoS model supports a framework based QoS flow. The 5G QoS model supports both a QoS flow requiring a Guaranteed Flow Bit Rate (GFBR) and a QoS flow not requiring the GFBR.

The QoS flow is a finest granularity for QoS distinction in the PDU session.

The QoS Flow Identifier (QoS Flow ID (QFI)) is used to identify the QoS flow within the 5G system. The QFI is unique in the PDU session. User plane traffic having the same QFI in the PDU session receives the same traffic delivery processing (e.g., scheduling, admission threshold, etc.). The QFI is delivered in an encapsulation header on N3 (and N9). The QFI may be applied to PDUs (i.e., IP packets, unstructured packets, and Ethernet frames) of different payload types.

However, in this specification, for convenience of description, 'QoS' and 'QoS flow' are used interchangeably. Therefore, in this specification, 'QoS' may mean 'QoS flow' or 'QoS' may be interpreted to mean 'QoS flow'.

In the 5G system, QoS flows may be controlled by the SMF upon PDU session establishment or QoS flow establishment/modification.

When applicable, all QoS flows have the following features.

QoS profile configured in the AN in advance or provided to the AN from the SMF through the AMF via the N2 reference point;

One or more network-providing QoS rule(s) and/or one or more UE derived QoS rule(s) provided to the UE from the SMF through the AMF via the N1 reference point SDF classification and QoS related information (e.g., session-Aggregate Maximum Bit Rate (AMBR)) provided to the UPF from the SMF via the N4 reference point.

The QoS flow may be 'guaranteed bit rate (GBR)' or 'non-guaranteed bit rate (Non-GBR)' depending on the QoS profile. The QoS profile of the QoS flow includes the following QoS parameters.

i) For each QoS flow, the QoS parameters may include the following:

5G QoS Indicator (5QI): The 5QI is a scalar for referring to 5G QoS features (i.e., controlling QoS forwarding handling access node-specific parameters for QoS flows, e.g., scheduling weights, grant thresholds, queue management thresholds, link layer protocol settings, etc.).

Allocation and Retention Priority (ARP): The ARP includes priority levels, pre-emption capabilities, and preemption vulnerability. The priority level defines the relative importance of the resource request. The priority level is used for determining whether a new QoS flow needs to be accepted or rejected when the resource is restricted and used for determining whether the existing QoS flow preoccupies the resource while the resource is restricted.

ii) Further, only in the case of each GBR QoS flow, the QoS parameters may additionally include the following:

GFBR—uplink and downlink;

Maximum Flow Bit Rate (MFBR)—uplink and downlink; and

Notification control.

iii) Only in the case of non-GBR QoS flow, the QoS parameters may additionally include the following: Reflective QoS Attribute (RQA)

Methods for controlling the QoS flow are supported.

1) Case of non-GBR QoS flow: If a standardized 5QI or a preconfigured 5QI is used, the 5QI value is used as the QFI of the QoS flow and the default ARP is preconfigured in the AN;

2) Case of GBR QoS flow: If a standardized 5QI or a preconfigured 5QI is used, the 5QI value is used as the QFI of the QoS flow. The default ARP is transmitted to the RAN when the PDU session is established, and a User Plane (UP) of the PDU session is activated whenever the NG-RAN is used;

3) Case of GBR and non-GBR QoS flows: The assigned QFI is used. The 5QI value may be standardized, preconfigured, or unstandardized. The QoS profile and QFI of the QoS flow may be provided to (R)AN through N2 when establishing the PDU session or when establishing/changing the QoS flow, and the user plane (UP) of the PDU session is activated whenever the NG-RAN is used.

The UE may perform marking and classification of UL user plane traffic (i.e., association of UL traffic to QoS flows) based on QoS rules. The rules may be explicitly provided to the UE (when establishing the PDU session or QoS flow), preconfigured in the UE, or implicitly derived by the UE by applying reflective QoS.

The QoS rules may include unique QoS rule identifiers within the PDU session, QFIs of associated QoS flows, one or more packet filters, and precedence values. In addition, for the assigned QFI, the QoS rule may include QoS parameters associated with the UE. There may be one or more QoS rules associated with the same QoS flow (i.e., having the same QFI).

Default QoS rules may be required for all PDU sessions. The default QoS rule may be the only QoS rule of the PDU session that may not include the packet filter (in this case, the highest priority value (i.e., the lowest priority) should be used). If the default QoS rule does not include the packet filter, the default QoS rule defines processing of packets which do not match another QoS rule in the PDU session.

The SMF performs binding between SDFs for QoS flows according to QoS and service requirements of the SDF. The SMF allocates the QFI to the new QoS flow and derives QoS parameters of the new QoS flow from the information provided by the PCF. When applicable, the SMF may provide the QFI to the (R)AN together with the QoS profile. The SMF provides an SDF template (i.e., a set of packet filters associated with the received SDF received from the PCF) together with an SDF priority, QoS related information, and corresponding packet marking information (i.e., classification of the user plane traffic and application and marking of a bandwidth are enabled by using a QFI, Differentiated Services Code Point (DSCP) values, and optionally reflective QoS indications for UPF). If applicable, the SMF assigns unique QoS rule identifiers within the PDU session to which the QFI of the QoS flow is added, sets the packet filter(s) for the UL portion of the SDF template, and sets a QoS rule priority for the SDF priority to generate the QoS rule(s) for the PDU session. The QoS rule is provided to the UE which enables classification and marking of the UL user plane traffic.

Figure 16:
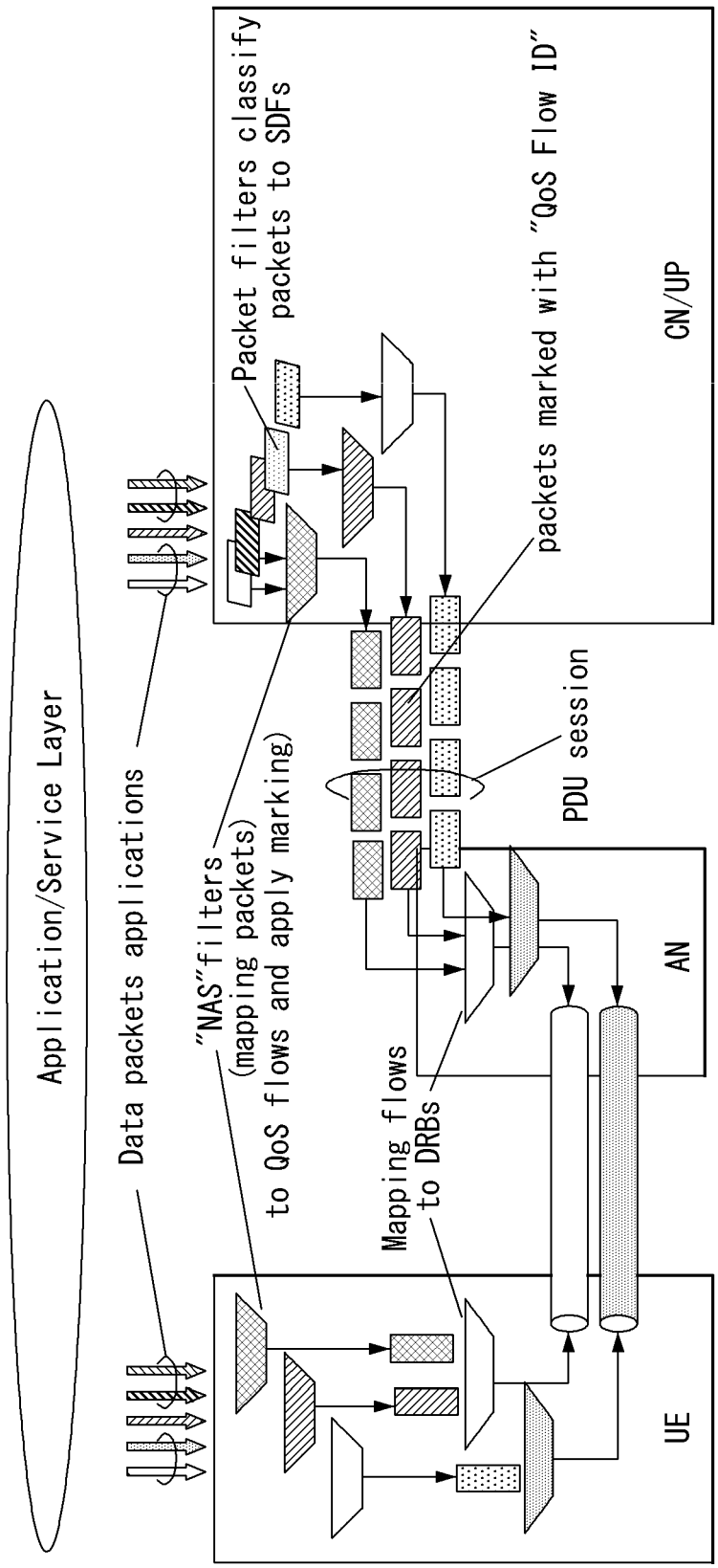
FIG. 16 illustrates classification and user plane marking of a QoS flow and mapping of the QoS flow to an AN resource according to an embodiment of the present invention.

FIG. 16 illustrates classification and user plane marking of a QoS flow and mapping of the QoS flow to an AN resource according to an embodiment of the present invention.

1) Downlink

The SMF assigns the QFI for every QoS flow. In addition, the SMF derives the Qos parameter from the information provided by the PCF.

The SMF provides the (R)AN with the QFI along with the QoS profile that contains the QoS parameters of the QoS flow. In addition, when the PDU session or the QoS flow is established, he QoS parameters of the QoS flow are provided to the (R)AN as the QoS profile via N2. In addition, the user plane is activated whenever the NG-RAN is used. Further, the QoS parameters may be preconfigured in the (R)AN for the non-GBR QoS flow.

Further, in order to allow the UPF to perform classification and marking of downlink user plane packets, the SMF provides to the UPFs the SDF template (that is, the set of packet filters associated with the SDF received from the PCF) along with the SDF preferences and corresponding QFIs.

Downlink incoming data packets are classified based on the SDF template according to the SDF preference (without additional N4 signaling initiation). The CN classifies user plane traffic belonging to the QoS flow through N3 (and N9) user plane marking using the QFI. The AN binds the QoS flow to the AN resource (i.e., DRB for 3GPP RAN). In this case, a relationship between the QoS flow and the AN resource is not limited to 1:1. Configuring the AN resource required for mapping the QoS flow to the DRB so as for the UE to receive the QFI depends on the AN (and the reflective QoS may be applied).

If no match is found and all QoS flows are associated with one or more DL packet filters, the UPF may discard the DL data packet.

The following features are applied to handling downlink traffic:

The UPF maps the user plane traffic to the QoS flow based on the SDF template.

The UPF performs session-AMBR enforcement and performs PDU counting to support charging.

The UPF may transmit PDUs of the PDU session in a single tunnel between 5GC and (A)AN, and the UPF may encapsulate the QFI in the encapsulation header.

The UPF performs transport level packet marking on the downlink (e.g., sets a DiffServ code in an outer IP header). Transmission level packet marking is based on ARP of 5QI and associated QoS flows.

The (R)AN maps PDUs from the QoS flow to access-specific resources based on QFI and associated 5G QoS characteristics and parameters by considering the N3 tunnel associated with the downlink packet.

If the reflective QoS is applied, the UE may generate a new derived QoS rule (or may be referred to as a 'UE derived QoS rule'). The packet filter in the Derived QoS rule may be derived from a DL packet (i.e., a header of the DL packet), and the QFI of the derived QoS rule may be configured according to the QFI of the DL packet.

2) Uplink

The SMF assigns the QoS rule identifier, adds the QFI of the QoS flow, sets the packet filter(s) in the uplink portion of the SDF template, and sets the QoS rule precedence in the SDF precedence to generate the QoS rule(s) for the PDU session. The SMF may provide the QoS rules to the UE so that the UE may perform classification and marking.

The QoS rules include the QoS rule identifier, the QFI of the QoS flow, one or more packet filters, and a precedence value. The same QFI (i.e., the same QoS flow) and one or more QoS rules may be associated.

The default QoS rule is required for every PDU session. The default QoS rule is the QoS rule of the PDU session that does not include a packet filter (in this case, the highest precedence value (i.e., the lowest priority) is used). If the default QoS rule does not include the packet filter, the default QoS rule defines processing of packets which do not match another QoS rule in the PDU session.

The UE performs classification and marking of uplink user plane traffic. That is, the uplink traffic is associated with the QoS flow based on the QoS rule. The rule may be explicitly signaled via N1 (when establishing the PDU session or establishing the QoS flow), or may be preconfigured in the UE, or implicitly derived by the UE from the reflected QoS.

In the UL, the UE evaluates the UL packet for the packet filter of the QoS rule based on the precedence value of the QoS rule (i.e., in order of increasing precedence value) until a matching QoS rule (i.e., the packet filter matches the UL packet) is found. The UE binds the UL packet to the QoS flow using the QFI in the corresponding matching QoS rule. The UE binds the QoS flow to the AN resource.

If no match is found and the default QoS rule includes one or more UL packet filters, the UE may discard the UL data packet.

The following features are applied to handling uplink traffic:

The UE may use the stored QoS rules in order to determine the mapping between the UL user plane traffic and the QoS flow. The UE may mark the UL PDU as the QFI of the QoS rule including a matching packet filter and transmit the UL PDU using the corresponding access specific resource for the QoS flow based on the mapping provided by the RAN.

The (R)AN transmits the PDU to the UPF over the N3 tunnel. When a UL packet passes from the (R)AN to CN, the (R)AN encapsulates the QFI in the encapsulation header of the UL PDU and selects the N3 tunnel.

The (R)AN may perform transmission level packet marking in the uplink and transmission level packet marking may be based on the ARP of the 5QI and the associated QoS flow.

The UPF checks whether the QFIs of the UL PDUs are aligned with QoS rules provided to the UE or implicitly derived by the UE (e.g., in the case of the reflective QoS).

The UPF performs the session-AMBF enforcement and counts packets for charging.

For a UL classifier PDU session, UL and DL session-AMBR should be executed in the UPF supporting a UL classifier function. Further, the DL session-AMBR should be separately executed in all UPFs terminating the N6 interface (i.e., an inter-UPF interaction is not required).

For a multi-home PDU session, the UL and DL session-AMBR is applied to the UPF supporting a branch point function. Further, the DL session-AMBR should be separately executed in all UPFs terminating the N6 interface (i.e., the inter-UPF interaction is not required).

The (R)AN should enforce maximum bit rate (UE-AMBR) restriction in the UL and the DL for each non-GBR QoS flow. When the UE receives the session-AMBR, the UE should perform the PDU session based UL rate restriction for non-GBR traffic using the session-AMBR. Rate restriction enforcement per PDU session is applied to a flow that does not require a guaranteed flow bit rate. The MBR per SDF is mandatory for GBR QoS flows but optional for non-GBR QoS flows. The MBR is enforced in the UPF.

QoS control for unstructured PDUs is performed at the PDU session level. When the PDU session is set up for transmission of the unstructured PDU, the SMF provides the QFI to be applied to any packet of the PDU session to the UPF and the UE.

MM/SM Separation

In the core network of the 5th generation system (5GS), a network node (AMF) for managing mobility and a network node (SMF) for managing sessions are separated into separate functions. If the MME in the EPC in the related art plays a central role of the control plane, the entity/node is modularized and separated for each major function in the 5GC. That is, in THE 5GS, it can be seen that the MME in the related art is divided into an AMF serving to perform a mobility management function and an SMF serving to perform a session management function.

The SMF managing each session takes charge of the SM-related NAS layer messages and procedures and the AMF takes charge of overall mobility management (MM) including connection management (CM). Roles of the AMF and the SMF currently defined in TS 23.501 are as follows.

1. AMF

The AMF includes the following functions. Some or all of the AMF functions may be supported by a single instance of the AMF.

Termination of RAN CP interface (N2)

Termination of NAS (N1), NAS ciphering and integrity protection

Registration management

Connection management

Reachability management

Mobility management

Lawful intercept (for the AMF event and the interface with the L1 system)

Transparent proxy for SM message routing

Connection authentication

Connection authorization

Security anchor function (SEA): The SEA interacts with the AUSF and the UE and receives an intermediate key established as a result of a UE authentication procedure. In the case of USIM based authentication, the AMF retrieves a security material in the AUSF.

Security context management (SCM): The SCM receives a key that the SEA uses to extract an access-network specific key.

There is only one NAS interface instance per access network between the UE and the CN, regardless of the number of network functions, and terminated at least in one of the network functions implementing NAS security and mobility management.

In addition to the functions of the AMF described above, the AMF may include the following functions to support non-3GPP access networks:

Supporting N2 interface with N3IWF. Some information (e.g., 3GPP cell identification) and procedures (e.g. hand-over related) defined via the 3GPP access through the interface may not be applied and non-3GPP access specific information not applied to the 3GPP access may be applied.

Supporting the NAS signaling to the UE through N3IWF. Some procedures supported by the NAS signaling over the 3GPP access may not be applicable to unreliable non-3GPP (e.g., paging) access.

Supporting authentication of the UE connected through N3IWF.

Management of mobility and authentication/security context state(s) of the UE connected through the non-3GPP access or 3GPP and non-3GPP access.

Supporting a valid co-ordinated RM management context through the 3GPP and non-3GPP access.

Supporting a dedicated CM management context for the UE for the connection through the non-3GPP access.

All functions need not be supported in the instance of the network slice.

2. SMF

The SMF includes the following functions. Some or all of the SMF functions may be supported by a single instance of the SMF.

Session management (e.g., session establishment, modification, and release including maintaining a tunnel between the UPF and the AN node)

UE IP address allocation and management (including optional authorization).

Selection and control of the UP function.

The UPF configures traffic steering in order to route traffic to an appropriate target.

Termination of the interface for the policy control function.

Controlling policy enforcement and some of QoS.

Lawful intercept (for the SMF event and the interface with the L1 system)

Termination of an SM portion of the NAS message.

Downlink data notification.

Initiator of AN specific SM information transmitted to the AN through the N2 and the AMF.

Determining an SSC mode of the session (in the case of the IP type PDU session)

Roaming function:

Handle local enforcement for applying QoS SLA (VPLMN).

Charging data collection and charging interface (VPLMN).

Lawful intercept (for the SM event and the interface with the L1 system in the VPLMN)

Supporting the interaction with external DN for delivering the signaling PDU session authentication/approval by the external DN.

All functions need not be supported in the instance of the network slice.

In order to start the SM procedure, the CM-CONNECTED state, i.e., the secure signaling connection between the UE and the CN, should be established similarly to the related art. The SM NAS messages should go through the AMF and in this case, the SM NAS messages are transparent to the AMF. That is, the AMF may decrypt or recognize the contents of the SM NAS message itself passing therethrough. Thus, if there are multiple SMFs, the AMF needs to be instructed separately which SMF to forward the NAS message to. To this end, information for forwarding/routing may be added separately to the outside of the SM NAS message.

If the PDU session is already generated, the PDU session ID of the PDU session may be displayed in a part where the AMF may be decrypted (especially, at the outside of the SM NAS message), and the AMF may find/recognize the SMF to which the message is to be forwarded/routed based thereon. In this case, a mapping table scheme may be used. If the PDU session is not generated, the AMF may perform the SMF selection function in consideration of information such as DNN and S-NSSAI in order to select an appropriate SMF. Information for the AMF to select the appropriate SMF may be displayed in a part where the AMF may decrypt/recognize the information in the UE and provided to the AMF.

Registration Procedure

In 5GS, the registration procedure is defined by integrating the attach procedure and the TAU procedure in the related art. However, depending on the purpose, the registration procedure may be classified/called as an initial registration procedure (attach), a registration update procedure (TAU), or a periodic registration update procedure (p-TAU).

Whether session establishment may be performed during the current registration procedure is currently under discussion, and there may be a scheme of entering the SM procedure immediately after the end of the RM procedure and a scheme of piggybacking and transmitting the SM message like the EPC technology.

Figure 17:
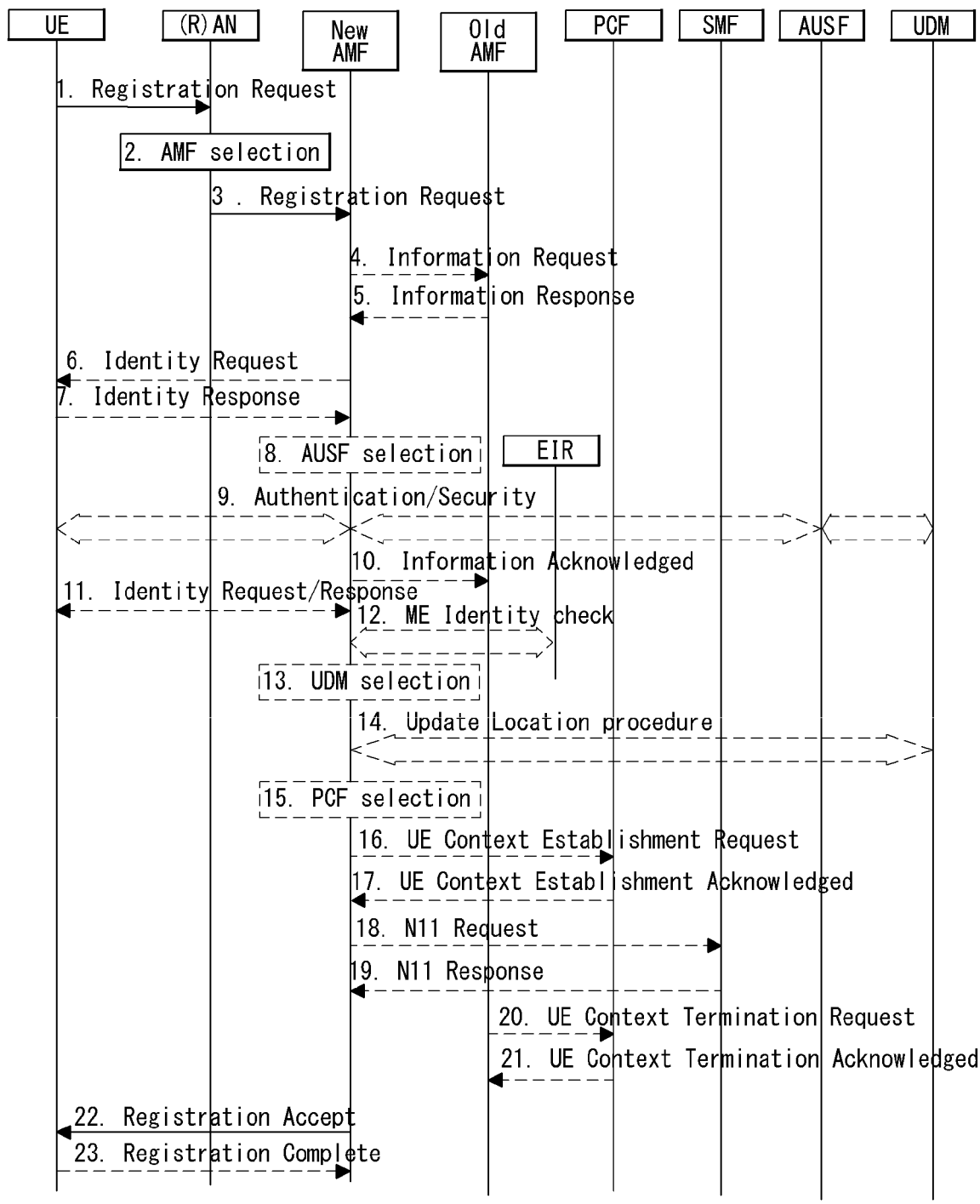
FIG. 17 is a flowchart illustrating a registration procedure applicable to the present invention.

The registration procedure currently reflected in TS 23.502 v0.2.0 is illustrated in FIG. 17.

FIG. 17 is a flowchart illustrating a registration procedure applicable to the present invention.

1. UE to (R)AN: AN message (AN parameter, registration request (registration type, subscriber permanent identifier (SUPI) or temporary user ID, security parameter, NSSAI, UE 5GCN capability, and PDU session status)).

For 5G-RAN, the AN parameter includes, for example, SUPI, temporary user ID, selected network, and/or NSSAI.

The registration type may indicate whether the UE wants to perform "initial registration (i.e., UE is in a non-registration state)", "mobility registration update (i.e., UE is in a registered state and initiates a registration procedure due to mobility)" or "periodic registration update (i.e., the UE is in the registered state and initiates the registration procedure due to a periodic update timer expiration)". If included, the temporary user ID may indicate the last serving AMF. If the UE is already registered via the non-3GPP access in a PLMN different from the PLMN of the 3GPP access, the UE should not provide the UE temporary ID assigned by the AMF during the registration procedure via the non-3GPP access.

The security parameters are used for authentication and integrity protection. The NSSAI indicates network slice selection assistance information. The PDU session state indicates PDU sessions available (previously established) at the UE.

2. If the SUPI is included or the temporary user ID does not indicate a valid AMF and/or (R)AN, the AMF is selected based on the (R)AT and the NSSAI. The (R)AN selects the AMF as described in TS 23.501. If the (R)AN may not select the AMF, the registration request is delivered to the default AMF. The default AMF is responsible for selecting the appropriate AMF for the UE. The relocation between the default AMF and the selected AMF is described in Section 4.2.2.2.3, where the initial AMF refers to the default AMF and the target AMF refers to the selected AMF.

3. (R)AN to AMF: N2 message (N2 parameter, registration request (registration type, subscriber permanent identifier or temporary user ID, security parameter, and NSSAI)).

When the 5G-RAN is used, the N2 parameter includes location information, cell identifier, and RAT type associated with the cell on which the UE camps.

If the Registration type indicated by the UE is the periodic registration update, steps 4 to 17 may be omitted.

4. [Conditional] new AMF to old AMF: Request for information (complete registration request).

If the temporary user ID of the UE is included in the registration request and the serving AMF is changed since the last registration, the new AMF may transmit an information request to the old AMF that includes the complete registration request IE to request the SUPI and MM context of the UE.

5. [Conditional] old AMF to new AMF: Informational response (SUPI, MM context, SMF information). The old AMF responds with the informational response to the new AMF that includes the SUPI and the MM context of the UE. If there is information on an active PDU session in the old AMF, the old AMF includes SMF information including the SMF ID and the PDU session ID.

6. [Conditional] AMF to UE: Identification request ( ).

If the SUPI is not provided by the UE or retrieved from the old AMF, the identification request procedure is initiated by the AMF transmitting an identity request message to the UE.

7. [Conditional] (R)AN to AMF: Identification response ( ).

The UE responds with an identification response message containing the SUPI.

8. The AMF may determine to invoke the AUSF. In this case, the AMF may select the AUSF based on the SUPI.

9. The AUSF should initiate authentication of the UE and NAS security functions.

The AMF relocation procedure (e.g., due to network slicing) may occur after step 9.

10. [Conditional] new AMF to old AMF: Information reception acknowledged ( ).

If the AMF is changed, the new AMF acknowledges delivery of the UE MM context. If the authentication/security procedure is unsuccessful, registration is rejected, and new AMF sends a rejection indication to the old AMF. The old AMF continues the procedure as if no information request is received.

11. [Conditional] AMF to UE: Identification request ( ).

If the PEI is not provided by the UE or not retrieved from the old AMF, the identification request procedure is initiated by the AMF sending the identity request message to the UE to retrieve the PEI.

12. Optionally, AMF initiates ME identification. PEI verification is performed as described in Section 4.7.

13. If step 14 is performed, the AMF selects the UDM based on the SUPI.

The AMF selects the UDM as described in TS 23.501.

14. If the AMF is changed since the last registration, if there is no valid subscription context for the UE in the AMF, or if the UE provides the SUPI that does not refer to the valid context in the AMF, the AMF may initiate a location update procedure. This includes a case where the UDM initiates a cancel location for the old AMF. The old AMF removes the MM context and notifies all possible associated SMF(s), and the new AMF may generate an MM context for the UE after obtaining AMF related subscription data from the UDM. The update location procedure may be performed according to TS 23.501.

The PEI is provided to the UDM in the update location procedure.

15. Conditionally, based on the SUPI, the AMF selects the PCF. The AMF selects the PCF as described in TS 23.501 [2].

16. [Optional] AMF to PCF: UE context establishment request ( ).

The AMF asks the PCF to apply the operator policy for the UE.

17. PCF to AMF: UE context establishment acknowledgment Q.

The PCF acknowledges and responds to the UE context establishment request message.

18. [Conditional] AMF to SMF: N11 request ( ).

If the AMF is changed, the new AMF informs each SMF of the new AMF serving the UE.

The AMF verifies the PDU session state from the UE with the available SMF information. When the AMF is changed, the available SMF information may be received from the old AMF. The AMF may request that the SMF releases all network resources associated with a PDU session that is not active at the UE.

19. SMF to AMF: N11 response ( ).

The SMF may, for example, determine the trigger of the UPF relocation. If the Registration type indicated by the UE is the periodic registration update, steps 20 to 21 may be omitted.

20. [Conditional] AMF to PCF: UE context exit request ( ).

If old AMF previously requests that the UE context is established at the PCF, the old AMF terminates the UE context at the PCF.

21. AMF to PCF: UE context exit acknowledgment Q.

22. AMF to UE: Registration Approval (Temporary User ID, Registration Area, Mobility Restriction, PDU Session State, NSSAI, and Periodic Registration Update Timer).

The AMF transmits to the UE a registration grant message indicating that the registration is granted. If the AMF assigns a new temporary user ID, the temporary user ID is included. The mobility restriction is included when the mobility restriction is applied to the UE. The AMF indicates the PDU session state to the UE. The UE removes any internal resources associated with the PDU session that are not marked as active in the received PDU session state. If PDU session state information is present in the registration request, the AMF should indicate the PDU session state to the UE. The NSSAI includes granted S-NSSAIs.

23. [Conditional] (R)AN to AMF: Registration completed ( ).

The UE transmits a registration complete message to the AMF to check whether a new temporary user ID is assigned.

Hereinafter, a registration procedure having AMF relocation will be described.

Figure 18:
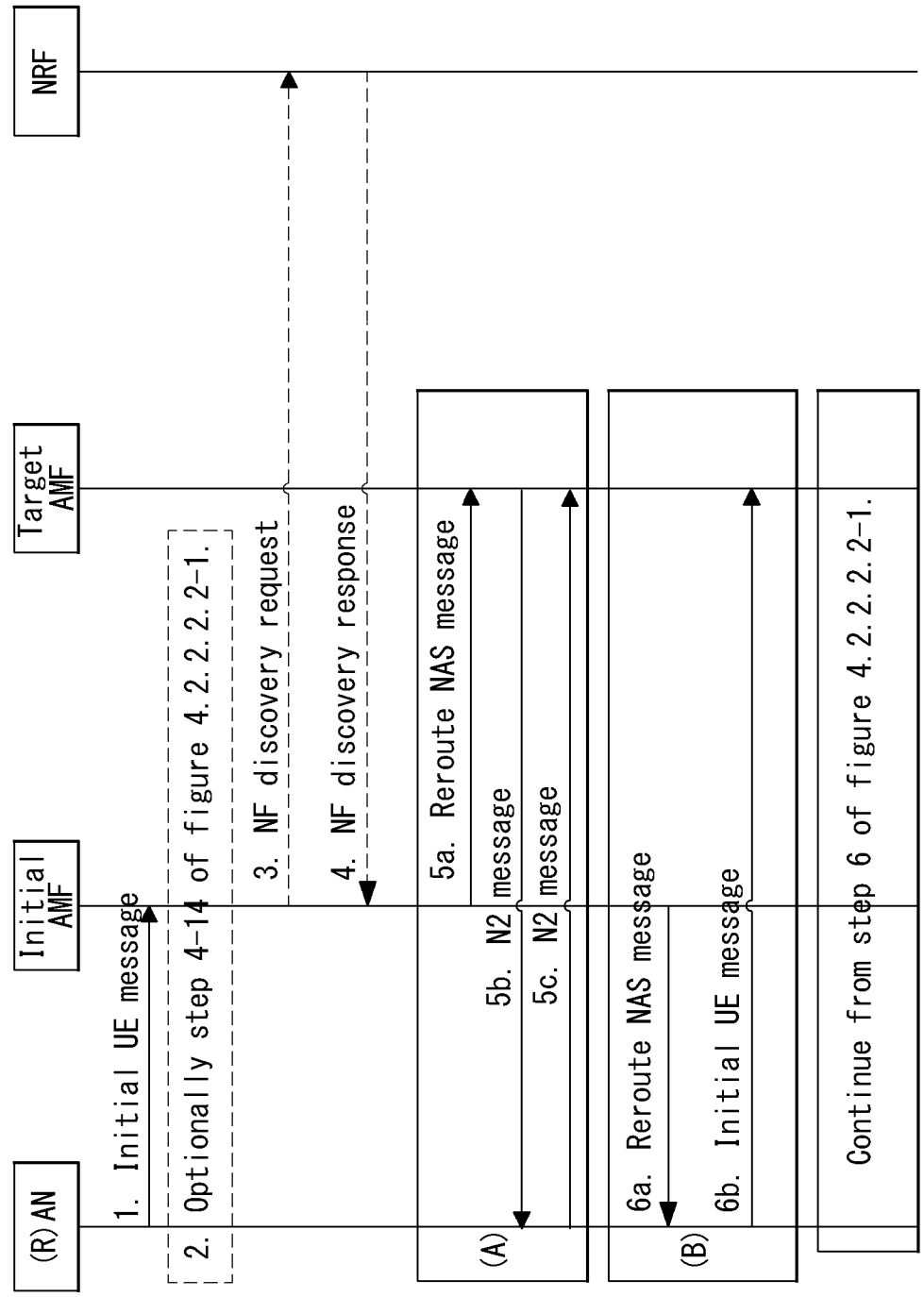
FIG. 18 illustrates an NAS message redirection procedure to which the present invention may be applied.

FIG. 18 illustrates an NAS message redirection procedure to which the present invention may be applied.

When an AMF receives a registration request, the AMF may need to route the registration request to another AMF again (e.g., because network slicing is used and the initial AMF is not suitable for serving the UE). The AMF relocation procedure described in FIG. 18 is used to reroute the NAS message of the UE to the target AMF during the registration process.

The first AMF and the second AMF register capabilities thereof in the NRF.

1. Steps 1 and 2 of FIG. 4.2.2.2.2-1 of TS 23.501 occur, and the (R)AN transmits a registration request message in an initial UE message to an initial AMF.

2. If the AMF needs SUPI and/or subscription information of the UE to determine whether to reroute the registration request or if integrity protection or integrity protection failure is indicated when the registration request is not transmitted, the AMF may perform steps 4 to 14 of FIG. 4.2.2.2.2-1.

3. [Conditional] AMF to NRF: NF discovery request (NF type).

The initial AMF determine to reroute the NAS message to another AM F. If the initial AMF does not store the target AMF address locally, the initial AMF transmits an NF discovery request to the NRF to find an appropriate target AMF that needs to provide the NF capability to the UE. The NF type is configured to the AMF.

4. NRF to AMF: NF discovery response (AMF list, NF capability).

The NRF responds with a set of potential target AMFs and capabilities thereof. The target AMF is selected by the initial AMF based on the information on the registered NF and the required functions.

5. Based on the local policy and subscription information, if the initial AMF determines to deliver the NAS message directly to the target AMF, the initial AMF may transmit a reroute NAS message to the target AMF. The reroute NAS message includes information that enables the (R)AN to identify the N2 endpoint and NAS message carried in step 1, and optionally includes the SUPI and MM context of the UE. If the network slicing is used and the initial AMF updates the NSSAI in step 1, the updated NSSAI is included. The target AMF updates the (R)AN with the newly updated N2 endpoint for the UE (step 5b) and the (R)AN identifies the updated N2 endpoint (step 5c). Step 5 may be omitted.

Steps 5b and 5c may occur individually or as part of the first consecutive required N2 interaction.

6. If the initial AMF determines to forward the NAS message to the target AMF via the RAN based on the local policy and subscription information, the initial AMF transmits the reroute NAS message to the RAN (6a). The reroute NAS message includes information on the target AMF and the registration request message carried in step 1, and may optionally further include the SUPI and MM context of the UE. If the network slicing is used and the initial AMF updates the NSSAI in step 1, the updated NSSAI is included in the reroute NAS message. The RAN sends an initial UE message to the target AMF (6b).

7. After receiving the registration request message transmitted in step 5a or 6b, the target AMF proceeds with the registration procedure (with the target AMF corresponding to the new AMF).

Method for Controlling Interaction Between MM and SM

The SM NAS message transmitted by the UE should always go through the AMF to be delivered to the SMF. Accordingly, the SM message may be attached or piggybacked to the MM or RM message and transmitted. This is similar to the PDN Connectivity Request message, which is an ESM message, is piggybacked and transmitted to an attach request message, which is an EMM message in EPC. In 5GC, a registration procedures similar to attach is defined. The PDU session establishment related message may or may not be piggybacked to the registration message.

If an SM message is piggybacked and transmitted to an MM message (when the SM message is transmitted in the initial message), the following problems may occur:

1) Problem 1

In the initial registration or attach process, if an SM request message for establishing/changing the PDU session is delivered together, the UE may encapsulate the following information in the registration request message (or may be referred to as a UL NAS message).

[Registration Request Message]
SM message container: PDU Session Establishment Request (DNN, S-NSSAI (1))
SM Routing Information: S-NSSAI(2) and/or DNN
Requested NSSAI: Set of S-NSSAI(3)

Here, S-NSSAI ((1) and (2)) included in SM-related items is S-NSSAI requested by the PDU session and S-NSSAI(3) included in the requested NSSAI is S-NSS to be considered when requesting registration. That is, the S-NSSAI ((1) and (2)) included in the SM may be a subset of the requested NSSAI. S-NSSAI ((1) and (2)) may each be defined as a single parameter and have the same value, and may be included in the requested NSSAI.

When the AMF selects an appropriate SMF through the SMF selection function, the AMF may consider information such as DNN and S-NSSAI, and the information may be displayed in a part where the AMF may decrypt/recognize the information in the UE and provided to the AMF.

2) Problem 1-1. Handling of Piggybacked SM Message Upon RM/MM Rejection—in the Case of Rejection of Registration Itself In the registration procedure, the AMF may reject the registration request of the UE for various reasons. In this case, the AMF may transmit a rejection message (i.e., registration rejection) to the registration request to the UE.

However, in the EPC in the related art, unlike the management and processing of SM and MM in one entity MME, since in 5GC, managing and processing is performed in separate SMF and AMF, even though the UE receives the rejection message from the AMF that manages/processes the MM, the UE may not know whether the SM message transmitted upon the registration request is granted/rejected. That is, the registration request of the UE is transmitted to the SMF via the AMF and when the rejection of the registration request is determined by the AMF, the SM message included in the registration request is not delivered to the SMF capable of performing respond-processing of the SM message. As a result, a problem occurs that the UE may not receive the response to the SM message.

3) Problem 1-2. Processing when RM/MM is Granted, but Specific Service is Rejected—in Case of Denial of Service Related to Specific Session The UE and the network using the network slicing go through a procedure of requesting and granting a service (or slice) during the registration process. The network should view the service/slice information requested from the terminal through the RM request (registration request), that is, the S-NSSAI included in the requested NSSAI, and encapsulate the S-NSSAI corresponding to the allowable service/slice information in an acceptance message. In this case, the S-NSSAI corresponding to the allowable/acceptable service/slice information may be referred to as Allowed NSSAI or Accepted NSSAI.

As such, the network may allow/accept or reject only some of the services/slices requested by the UE. At this time, if the PDU session request for the service/slice is piggybacked together, the network may process the registration request of the UE, but if the service/slice required to generate the PDU session needs to be rejected, the SM request corresponding to the service/slice needs to be rejected. However, if the service/slice is rejected in the access phase of the UE (i.e., viewing the S-NSSAI included in the requested NSSAI and determining whether the service/slice is allowable/acceptable), the AMF is not capable of delivering the SM request for the service/slice or may not deliver the SM request to the SMF. Even in this case, the UE may also receive a response to the MM/RM request, but may not receive a response to the piggybacked SM request.

4) Problem 2. Processing Upon Transmission Failure Due to MM/RM Layer Problem in SM Message Delivery In order to deliver the SM NAS messages in the structure of 5GS or 5GC, the SM NAS message should go through the AMF, and information for forwarding/routing should be added to the part where the AMF may interpret/recognize the information. Therefore, the SM NAS message needs additional message processing before being delivered to the lower layer (RRC) as in the related art (EPS and UMTS). If the layer performing such message processing is called an MM or RM layer, the following problem may occur.

An SM NAS message may be generated for the generation of a new session or management/cancellation of an existing session in the SM NAS layer or sublayer of the UE. The MM NAS layer of the UE encapsulates the SM NAS message by describing/adding additional information (for example, information such as PDU session ID, DNN, and/or S-NSSAI) to the SM NAS message. In this case, the encapsulated SM NAS message may be an extended form of the SM message, or may be an MM/RM message such as an MM NAS transport.

5) Problem 2-1. When a Problem Occurs in a Wireless or N2 Interval

If the MM/RM message is transmitted to the AMF, when transmission is unsuccessful or is rejected due to some problem in a lower interval (for example, a wireless AS interval including an RRC or RRC lower layer or an N2 interval between the RAN and the AMF), the UE receives an indication for the transmission failure from the lower layer before rejection in the NAS layer. The problem is that such a lower layer transmission failure indication is usually delivered only to the MM/RM layer or the layer that finally encapsulates the NAS message, so the SM layer that generates the SM NAS message may not recognize the transmission failure.

6) Problem 2-2. In Case of Rejection in AMF

The MM/RM message or the encapsulated NAS message is delivered to the AMF, but the SM NAS message may not be forwarded to the SMF and rejected due to problems in terms of RM, access, or AMF. At this time, the AMF transmits the rejection message to the layer which encapsulates the MM/RM layer or SM message of the UE. However, since the AMF may not generate the SM rejection message, the SM layer of the UE may not receive the response to the SM NAS message even though the SM layer transmits the SM NAS message.

Hereinafter, various methods for solving the problems will be proposed.

<Invention Proposal 1. Interaction Between MM and SM Layers in UE>

Invention Proposal 1 is to solve the problems through the interaction between the various layers or sublayers (e.g., MM, RM, SM, CM, RRC, etc.) in the UE.

Prior to examining the solution, in this specification, the MM layer refers to a layer that is in charge of overall mobility management and access, and may correspond to the RM layer in the 5GS. That is, the description/embodiment of the MM layer in this specification may be applied to the RM layer in the same manner or similarly. The SM, the MM layer, etc., may be a sublayer of the NAS layer and in this specification, an SM (sub) layer, an SM NAS (sub) layer, and a 5GSM (sub) layer may be used in the same sense, and an MM (sub) layer, an MM NAS (sub) layer and the 5GMM (sub) layer may be used in the same sense. Further, a message (e.g., an MM message) transmitted and received between the UE and the AMF may be collectively referred to as a "UL/DL NAS message" for convenience of description.

Figure 19:
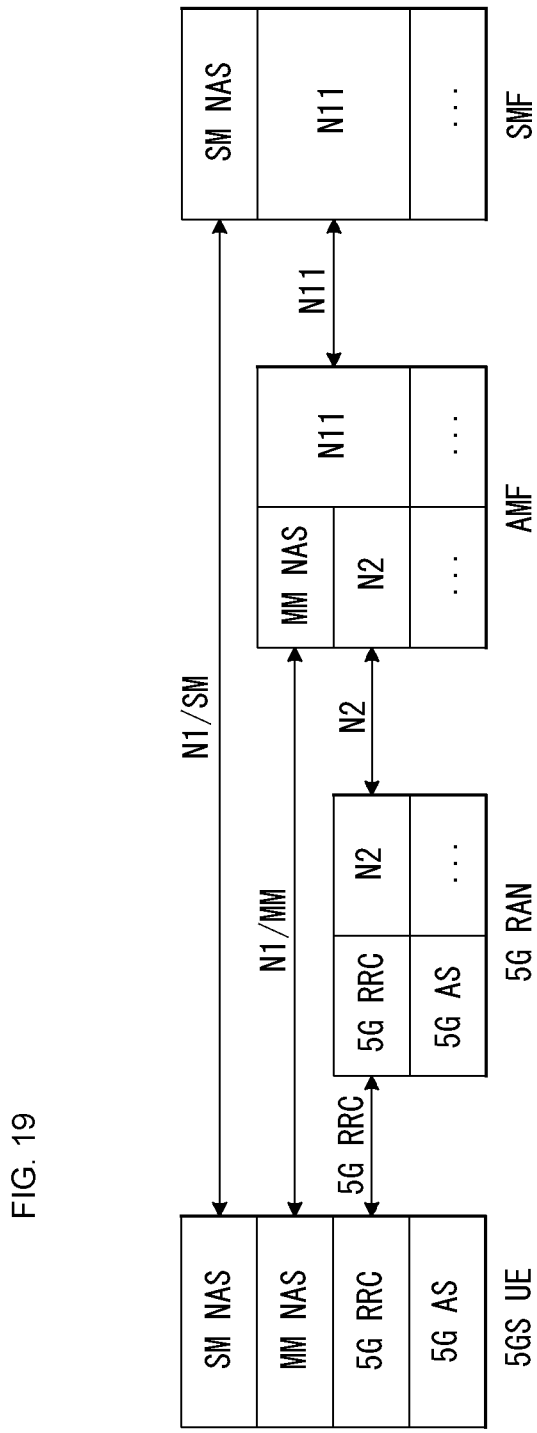
FIG. 19 illustrates a control plane protocol stack of a UE that may be applied to the present invention.

FIG. 19 illustrates a control plane protocol stack of a UE that may be applied to the present invention.

Referring to FIG. 19, the SM layer may be positioned as an upper layer of the MM layer unlike the related art. Accordingly, the UE may deliver the (5G) SM message generated by the SM layer to the MM layer which is a lower layer (within the terminal). In this case, the SM layer of the UE may start an NAS timer according to an SM procedure in which the corresponding message is sent. In general, timers of different characteristics and lengths are determined for each SM procedure and even if multiple SM procedures are performed at the same time and the same SM procedure is performed for multiple sessions, a separate timer may be assigned to each session. For example, if the PDU session establishment procedures for PDU sessions #1 and #2 are performed in parallel/independent at the same time, a timer (e.g., T35xx) is assigned/divided/initiated for each session or for each separately defined different unit. The timer is defined/configured as a message response waiting time in the NAS procedure and when the response is not received within a waiting time and the timer expires, the UE may retransmit the corresponding message a predetermined number of times. If even a predetermined number of retransmissions are unsuccessful, the UE may regard the procedure as a failure and perform a subsequent operation (e.g., interrupting a PDU session establishment/change procedure). The subsequent operations may be assumed to be applied similarly to the NAS of the EPS and the EPC and are described in detail in TS 24.301 and TS 24.008.

The MM NAS layer may piggyback the SM message received from the upper layer to the (5G) MM message including additional information and transmit the SM message to the lower layer. That is, the (5G) SM message is piggybacked on a specific (5G) MM transmission message, and to this end, the (5G) SM message may be transmitted as an information element of the (5G) MM transmission message. In this case, the UE, AMF, and SMF may perform the (5G) MM procedure and the (5G) SM procedure in parallel/independently. Thus, whether the (5G) MM procedure is successful is independent of whether the piggybacked (5G) SM procedure is successful.

In this case, the MM layer may also initiate/use the MM NAS timer for managing the MM procedure. The purpose of the timer is also the same as the SM NAS timer described above, and subsequent operations upon expiration may be defined for each procedure. The subsequent operations may be assumed to be applied similarly to the NAS of the EPS and the EPC and are described in detail in TS 24.301 and TS 24.008.

The MM message delivered to the lower layer may be transmitted to the AMF via the 5G RAN through a wireless layer. The MM layer of the AMF receiving the message may select the appropriate SMF based on the SM NAS forwarding/routing information contained in the MM message or forward/route the corresponding MM NAS message or forward/route the MM NAS message to the SMF already selected. However, the AMF may reject the MM message itself due to problems on the AMF and/or problems in the MM NAS layer. In addition/or, the AMF may reject the MM message if there is a problem in processing the SM message due to reasons related to the SM layer (e.g., no routing, no serving SMF found, etc.).

In this case, the AMF may transmit to the UE the MM rejection message in which the rejection reason (that is, the MM (rejection) reason value/code) is specified/included. More specifically, if the reason for rejection is a problem in the AMF and MM layers, the AMF may transmit a reason code indicating/specifying the reason to the UE and if the reason for rejection is a problem related to SM message processing, the AMF may transmit to the UE the reason code indicating/specifying the reason. For example, the reason value/code may be defined as follows.

XX. SM message handling failure
YY. No valid SMF available

The reason value/code may be used 1) in a case where it is impossible to process the SM message due to the problem of the SMF (e.g., # YY) and 2) in a situation in which the SM message should be processed or a case where it is impossible to process the SM message due to the problem of the AMF (e.g., # XX). However, the present invention is not limited thereto and the reason value/code may be defined/implemented as various embodiments so as to specify/indicate the rejection reason.

Upon receipt of the (MM) rejection message, the UE (in particular, the MM NAS layer of the UE) may first stop the NAS timer in operation for the MM procedure corresponding to the rejected MM message. In addition, the terminal (particularly, the MM NAS layer of the UE) checks the reason value/code included in the (MM) rejection message received from the AMF and take an action according to the reason value/code (for example, aborting the PDU session establishment/change procedure). When the reason indicates that the reason is related to the AMF, the UE (in particular, the MM NAS layer of the UE) may take the resulting operation (e.g., aborting the PDU session establishment/change procedure) and in addition, the UE may deliver, to the SM layer which is the upper layer, a rejection information/indication (i.e., information/indication that the SM message may not be routed/delivered) that the MM procedure is successful/is rejected.

Such rejection information/indication may not be defined as an inter-layer indication form, i.e., a separate message type, but delivered between the layers in the form of the information/indication itself. Such rejection information/indication may include MM failure/rejection information and a failure/rejection reason when the failure/rejection reason is the MM related reason and SM failure/rejection information (e.g., SM message routing failure/rejection information and failure/rejection reason) for the SM-related reason when the failure/rejection reason is the SM-related reason and may additionally include information (e.g., a backoff timer) for other failure/rejection related handling, etc. Here, each information/indication item that may be included in the rejection information/indication may be selectively included in the rejection information/indication according to the reason and the embodiment implementation.

And/or, if it is determined that the MM layer of the UE needs to transmit information to the SM layer, the MM layer may generate a pseudo-SM message by itself and deliver the generated pseudo-SM message to the upper layer. Such a pseudo-SM message may be transmitted in the form of the rejection message for the SM (Request) message requested by the SM layer and delivered to the upper layer, including the SM reason that is mapped to the reason which the MM layer receives (from the AMF). For example, if the received MM reason is a temporary AMF failure/rejection (due to congestion) or the like, the UE (in particular, the MM NAS layer of the UE) may encapsulate the SM reason indicating the reason such as congestion, etc., and/or a timer value similar to an MM backoff timer value received by the MM layer in the pseudo-SM message.

The SM layer of the UE may perform a subsequent operation according to a (pseudo-) SM rejection message received from the lower layer. Since the SM layer receives a response (especially, rejection) to the request according to a predetermined timer operation, the SM layer may stop the relevant SM NAS timer and perform a defined operation. However, this may be limited to the case where the MM layer and the SM layer of the UE use the same security context.

The SM layer that receives the rejection information/indication from the MM layer which is the lower layer may stop the SM NAS timer (e.g., T3580) for the rejected/unsuccessful (NAS) procedure and perform the resulting operation.

If the rejection reason received by the MM layer from the AMF is related to the MM (i.e., the MM reason), the MM layer may notify whether the problem in the MM layer is temporary or permanent at the time of delivering the rejection information/indication to the SM layer. If the rejection reason received by the MM layer from the AMF is related to the SM (i.e., the SM reason), the MM layer of the UE may notify to the SM layer the detailed SM rejection reason at the time of delivering the rejection information/indication. That is, the MM layer may inform that the rejection of the MM layer (i.e., no routing/delivery of SM messages) is due to the SM-related processing impossibility/failure/rejection of the AMF (i.e., a detailed reason).

If the rejection/failure reason is permanent, the SM layer of the UE may proceed with a release procedure for the session or DN that requests the SM message. And/or the SM layer of the UE may manage the session or DN by encapsulating the session or DN in a forbidden list in order not to proceed with an additional procedure for the session or DN. If the service for the corresponding session is absolutely necessary, the SM layer of the UE requests a deregistration from the MM layer to trigger a procedure for finding a new PLMN.

<Invention Proposal 1-1. MM Grant Having SM or Specific Service Rejection>

In the case of using the network slicing as in the scenario presented in Problem 1-2, the detailed service/slice requested through the MM procedure may be rejected even though the MM procedure is granted. If a generation request for the PDU session is piggybacked, the service requested by the PDU session may be included in the SM request in the form of S-NSSAI, and also included in the requested NSSAI list included in the MM request message.

Based on the invention proposal 1, it may be assumed that the UE sends a registration or MM request/message piggybacking the SM message to the network, and the network grants the registration or MM request/message, but rejects the individually requested service within the request/message. In this case, when the service to be rejected is a service of the SM request through the piggybacked SM message, the AMF may operate as follows.

The AMF may determine the allowed/accepted NSSAI for the UE by performing verification and authorization of the requested NSSAI included in the MM request/message. If the SM request/message and the corresponding S-NSSAI are specified in the MM request/message, the AMF performs the NSSAI verification procedure before forwarding the SM message to the SMF to check whether the service of the S-NSSAI is allowed for the UE. If the verification target S-NSSAI is not included in the allowed/accepted NSSAI, the AMF may discard the SM message corresponding to the verification target S-NSSAI and send an MM grant message for the MM request/message.

The MM grant message may include the allowed/accepted (S-)NSSAI information, rejected (S-)NSSAI information, and/or the rejection reason. Further, the MM grant message may information on whether the rejection for the (S-)NSSAI is temporary or permanent and/or a more detailed rejection reason. In addition, when the AMF rejects the (S-)NSSAI for a temporary reason such as congestion or the like, the AMF may transmit the backoff timer value included in the MM grant message.

Upon receiving the MM request/message in which the SM request/message is piggybacked, the AMF may encapsulate information indicating that the S-NSSAI requested through the SM request/message is rejected in the SM related information (within the MM grant message for the MM request/message). This may be included in the form of a predefined bit/flag indication or SM reason or in the form of the following MM reason. In this case, the MM reason value may indicate/mean the rejection reason for the piggybacked SM request/message as a special case rather than the rejection of the MM request/message. A configuration example of the reason may be configured by the following embodiment.

XX. Piggybacked SM message rejected.
YY. S-NSSAI for Piggybacked SM message not allowed.

When the UE receives an MM grant response from the AMF, processing may be performed similarly to the scheme proposed in Invention Proposal 1. The MM layer may inform the SM layer of rejection based on the information received from the AMF and in this case, the rejection may be delivered in the form of indication/information or in the form of the pseudo-SM message as proposed in Invention Proposition 1. In this case, however, since the MM procedure is successful, the information delivered to the SM layer may be limited to information on SM failure/rejection. When the SM layer receives the information on the SM failure/rejection from the lower layer, the SM layer stops the timer (for example, T3580) and performs a predefined additional/subsequent operation according to the received information.

<Invention Proposal 1-2. Interaction Among SM Layer, MM Layer, and AS Layer>

During the transmissions process of the MM message, due to a problem in the AS layer/interval and/or N2 layer/interval, the MM request message may not reach the AMF. This may be due to a radio link transmission/routing failure, a transmission/routing failure due to a specific reason for the AS layer/interval, and/or a transmission/routing failure due to a specific reason for the N2 layer/interval. If the failure is recognized, the AS layer/interval may inform the upper layer of the failure.

The MM layer may perform an operation according to a failure related indication (lower layer indication)/information received from the lower layer (e.g., AS layer/interval). If the SM message is piggybacked and transmitted in the MM message, the MM layer may transmit a transmission/routing failure indication/information to the SM layer. The failure indication/information transmission scheme adopts the scheme proposed in Invention Proposition 1, but the failure reason delivered at this time may be differentiated from Invention Proposal 1. For example, the failure reason may be delivered to the SM layer as an indication/information indicating the lower layer (transmission/routing) failure or the like or delivered to the SM layer through the pseudo-SM message as the reason value/code indicating the lower layer (transmission/routing) failure or the like.

<Invention Proposal 1-3. Interaction Between SM Layer and NAS Sublayer>

Figure 20:
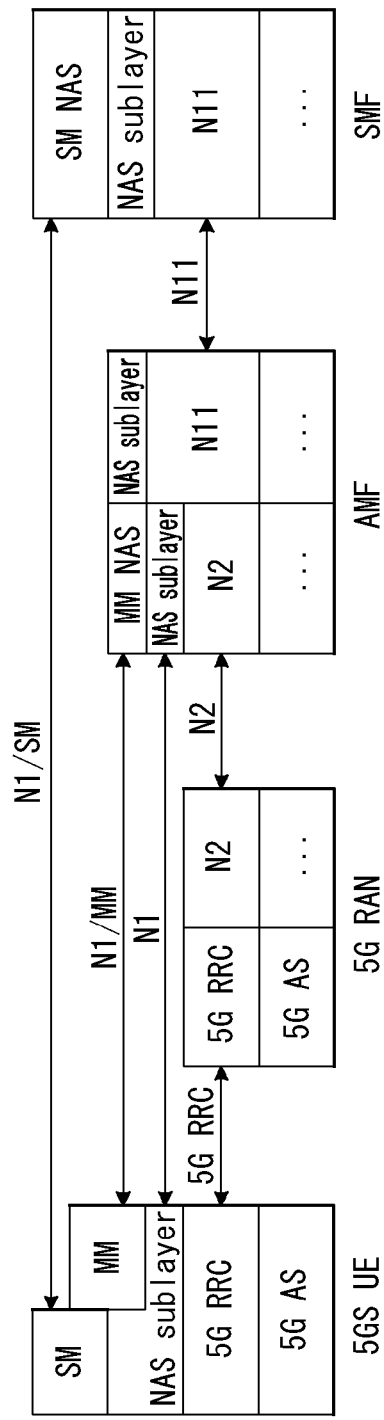
FIG. 20 illustrates a control plane protocol stack in a UE according to an embodiment of the present invention.

FIG. 20 illustrates a control plane protocol stack in a UE according to an embodiment of the present invention.

The newly defined/proposed NAS sublayer in FIG. 20 is a sublayer capable of supporting both MM and SM, and may be responsible for reliable NAS message delivery between Core-UEs.

In the application of the protocol stack of Invention Proposal 1-3, the interaction between the MM layer and the SM layer of the operations proposed in Invention Proposals 1, 1-1, and 1-2 above may be applied to the NAS sublayer. In other words, the interaction between the MM layer and the SM layer proposed above may be controlled/performed by the NAS sublayer, and the only difference is that the information delivery to the SM layer that is in charge of the MM layer is performed by the NAS sublayer (that is, delivery of information from the MM layer to the SM layer via the NAS sublayer). Therefore, the information delivered by the NAS sublayer to the SM layer and the delivery scheme are similar to the previously proposed embodiments.

<Invention Proposal 2. AMF Handling/Control of SM Procedure>

Invention Proposal 2 intends to solve the above-described problems through the handling and control of the SM procedure in the AMF.

Prior to examining the solution, in this specification, the MM layer refers to a layer that is in charge of overall mobility management and access, and may correspond to the RM layer in the 5GS. That is, the description/embodiment of the MM layer in this specification may be applied to the RM layer in the same manner or similarly. The SM, the MM layer, etc., may be a sublayer of the NAS layer and in this specification, an SM (sub) layer, an SM NAS (sub) layer, and a 5GSM (sub) layer may be used in the same sense, and an MM (sub) layer, an MM NAS (sub) layer and the 5GMM (sub) layer may be used in the same sense. Further, a message (e.g., an MM message) transmitted and received between the UE and the AMF may be collectively referred to as a "UL/DL NAS message" for convenience of description.

Currently, the AMF may not recognize the SM message (transparent to AMF), and may only determine forwarding/routing of the SM message based on SM related information added to the outside of the SM message. Therefore, the AMF has a limitation in performing an operation associated with the SM, which causes the above-mentioned problems.

In order to solve the problems, special purpose SMF (hereinafter, referred to as 'SMF for error') for error handling/processing may be separately newly defined, such as a case where the AMF may not route/forward the SM request/message to the SMF or the requested service itself is not allowed. Such an 'SMF for error' may be defined as an SMF that may not include a function for a normal session management/procedure and performs only an operation for coping with an SM (request/message) rejection case (or the above-described error case). In addition/alternatively, an operation/function of the 'SMF for error' may be implemented/performed by the 'default SMF'.

As pointed out above, when a failure/rejection case occurs in the AMF, such as a case of MM/SM failure/rejection or service rejection, the AMF may deliver the received message as the 'SMF for error'. Such an operation may be defined in advance by a policy and/or configuration of a network operator. When the AMF delivers the SM message as the 'SMF for error', the AMF may additionally deliver information on a problem situation (i.e., a routing/forwarding failure situation of the SM message) and/or the failure/rejection reason through the N11 message.

The 'SMF for error' may generate the SM rejection message based on the information received from the AMF and/or the information included in the SM message, and deliver the SM rejection message to the AMF. The AMF may piggyback the SM rejection message and transmit the MM rejection/grant message when the MM rejection/grant is performed. In this case, the MM layer and the SM layer of the UE may each perform an additional operation/procedure according to the network response (i.e., the MM rejection/grant message). In this case, the additional operation/procedure follows the operation/procedure described in TS 23.502 and the resulting detailed NAS layer operation is assumed to be similar to the NASs of the EPS and the EPC and this is described in detail in TS 24.301 and TS 24.008.

<Invention Proposal 2-1. SM Sublayer in AMF>

Figure 21:
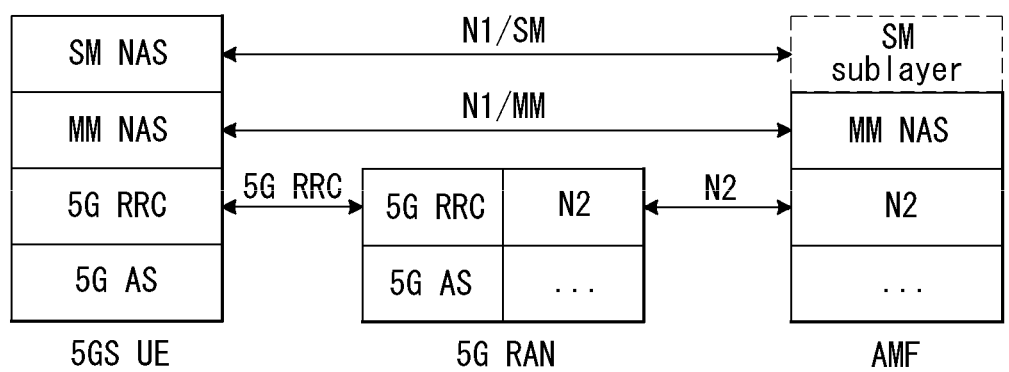
FIG. 21 illustrates a control plane protocol stack in a UE according to an embodiment of the present invention.

FIG. 21 illustrates a control plane protocol stack in a UE according to an embodiment of the present invention.

Referring to FIG. 21, the function of the 'SMF for error' proposed in Invention Proposal 2 may be implemented as the sublayer of the AMF rather than a separately defined SMF. In this case, the AMF may perform error processing/handling using the SM sublayer implemented inside without interacting with the separate SMF. The function/operation of the SM sublayer may be the same as the 'SMF for error' described in Invention Proposal 2 above.

On the other hand, the CN side may (implicitly) locally release the PDU session for some reason, and the AMF may delete the context of the locally released PDU session. In this case, when the UE is in the CM-IDLE state, the context for the corresponding PDU session may be maintained as a result of not receiving an explicit release message for the corresponding PDU session. Thereafter, the UE may perform the following MM procedure including/using the corresponding PDU session ID in order to receive the service through the corresponding PDU session (e.g., when MO data is generated).

Registration update (PDU session activation)

Service request (PDU session activation)

However, the PDU session is already locally released in the CN, and AMF does not have serving SMF information for the PDU session. That is, a problem arises in that the UE unnecessarily performs/initiates the MM procedure for the PDU session that is already released. As one of methods for solving such a problem, a method of enabling whether the PDU session is locally released to be known through PDU session state exchange between the UE and the AMF may be proposed. However, even in this case, since the UE may not know the reason for local release of the PDU session, there may be a problem in that the MM procedure for the released PDU session is performed/initiated again. For example, the PDU session may be locally released due to release due to a specific SMF problem, a change in the subscription information of the user (in the UDM), and/or a change in the subscription information in the AMF, but the since the UE may not know the release reason, the UE may request the establishment of the PDU session again. Further, when the PDU session is released due to a local area data network (LADN), mobility restriction, etc. (e.g., out of LADN area, entering a non-permitted area, etc.), the AMF may know the release of the PDU session and synchronize the PDU session state, but there is a problem in that the AMF may not deliver the release of the PDU session to the UE (SM/MM separation).

Therefore, hereinafter, a method for solving the problem will be proposed with reference to FIG. 22.

Figure 22:
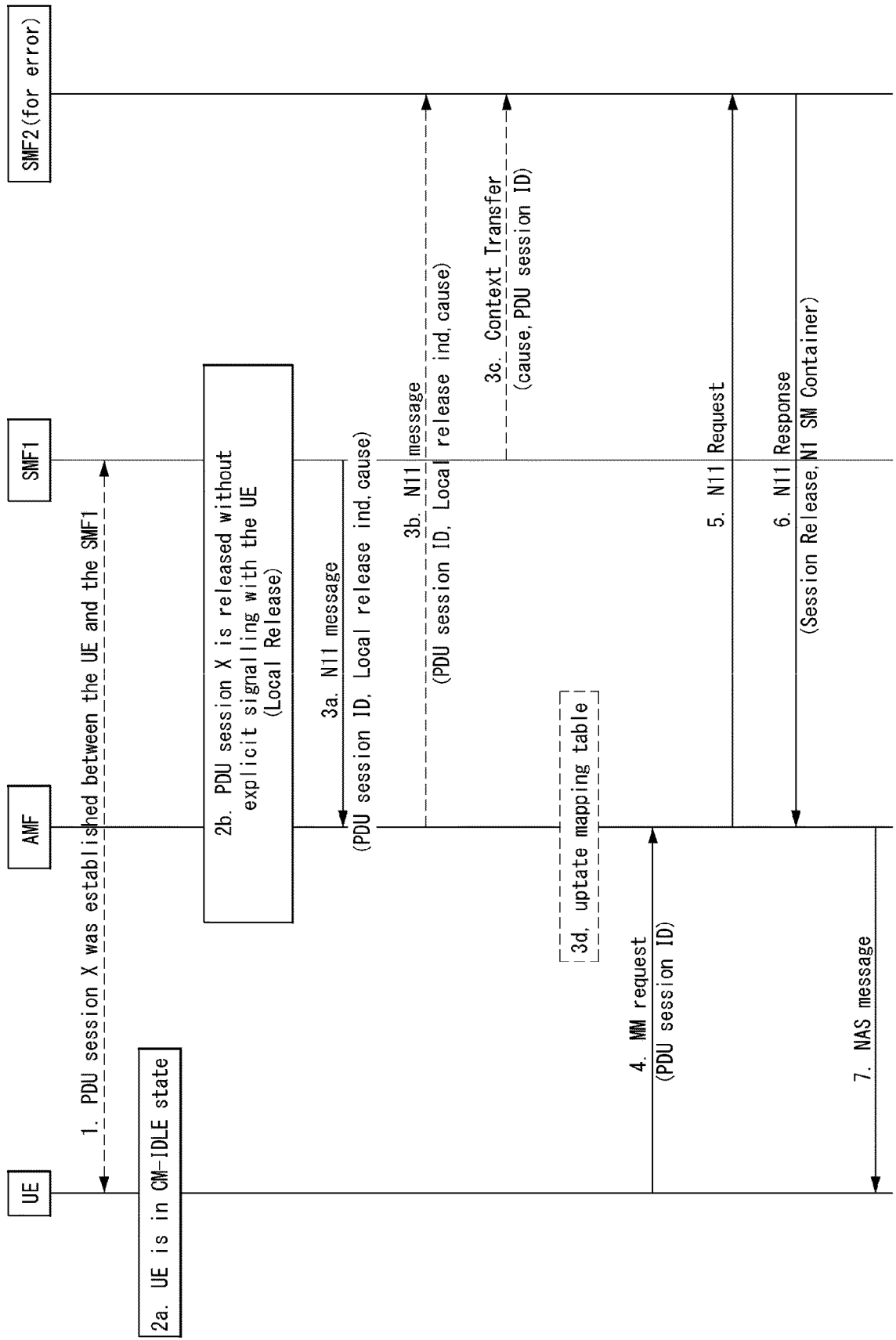
FIG. 22 is a flowchart illustrating an Invention Proposal 2 applied embodiment when PDU session synchronization is unsuccessful.

FIG. 22 is a flowchart illustrating an Invention Proposal 2 applied embodiment when PDU session synchronization is unsuccessful.

1. First, PDU session X may be established between the UE and SMF1.

2a. Next, the UE may enter the CM-IDLE state.

2b. Next, the PDU session X may be released without explicit/implicit signaling to the UE (local release).

3a. In the case of PDU session local release, which requires additional operations other than normal PDU session local release, the SMF1 may deliver the release reason upon the release to the AMF via the N11 message. In particular, the N11 message may include a locally released PDU session ID, a local release indication (ind), and/or a release reason.

3b. If the AMF is connected to SMF2 (SMF for error) proposed in Invention Proposal 2 (or if the SMF sublayer proposed in Invention Proposal 2-1 is implemented), the information received from SMF1 in 3a may be delivered to the SMF2 (or SMF sublayer). That is, the information received from the SMF1 may be delivered to the SMF2 in the form of N11-N11 message delivery through the AMF. In this case, the SMF1 may specify/indicate a target SMF (i.e., SMF2) address or ID to the AMF.

3c. If there is an interface between the SMFs, the release reason and the locally released PDU session ID information may be delivered from the SMF1 to the SMF2 in the form of context delivery.

That is, any one of steps 3b and 3c may be selectively performed according to the embodiment.

3d. When the AMF receives the N11 message through step 3a, the AMF may update the serving SMF mapping for the currently stored PDU session. In this case, the AMF may store/update the SMF2 (i.e., 'SMF for error') by specifying the serving AMF corresponding to the PDU session ID indicated through the received N11 message or specify and store/update that the PDU session corresponding to the indicated PDU session ID is locally released.

4. When the UE requests activation for the PDU session that is already released, the AMF may operate as follows in some cases.

In a case where it is recorded that the SMF mapped to the PDU session requested by the UE is the SMF2 (i.e., SMF for error) or is locally released:

5. The AMF may deliver to the SMF2 the PDU session activation request through the N11 request message.

6-7. The SMF2 may deliver the activation rejection for the PDU session that is already locally released to the UE through the AMF using the N11 response message. In this case, the SMF2 may deliver to the UE the release reason received through step 3b or 3c together. If it is necessary to limit the retry of the UE, the SMF2 may also deliver to the UE a retry back-off timer value for the locally terminated PDU session together.

If the PDU session requested by the UE is locally released without any operation:

The AMF may update a PDU session state field and send a service grant or service rejection message to the UE.

<Invention Proposal 3. Applicability to Non-3GPP Access>

The 5G RAN, 5G AS, 5G RRC, etc. described in Invention Proposals 1 and 2 are specified to describe 3GPP access, that is, NR, 5G LTE, and 5G-RAN, but are not limited thereto and may be applied even to the non-3GPP access in the same manner or similarly. In this case, the role of the 5G RAN may be substituted by N3IWF, and the RRC may correspond to the lower layer of the NAS.

Figure 23:
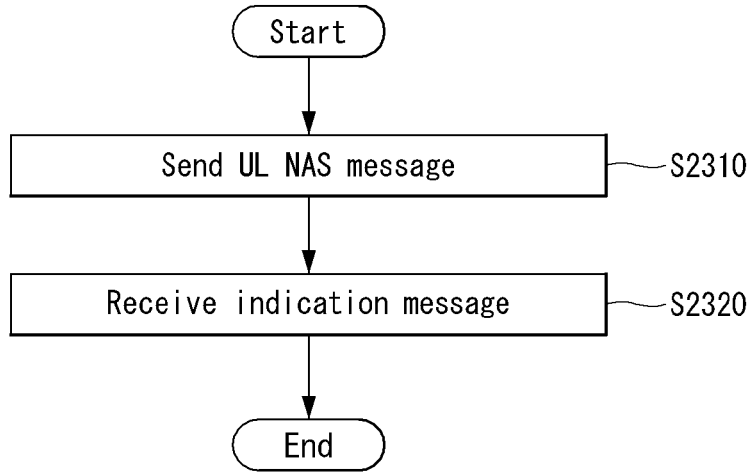
FIG. 23 is a flowchart illustrating a method for delivering an NAS message of a UE according to an embodiment of the present invention.

FIG. 23 is a flowchart illustrating a method for delivering an NAS message of a UE according to an embodiment of the present invention. The embodiment/description proposed by Invention Proposal 1 above may be applied in the same or similar manner to the flowchart, and a duplicated description will be omitted.

First, the UE may transmit a UL NAS message including the SM message to the AMF (S2310). In this case, the SM message may be a message for performing a request related to the PDU session (e.g., establishing/changing the PDU session). The SM message may be generated in the SM sublayer in the UE and delivered to the MM sublayer, which is the lower layer of the SM sublayer and the UL NAS message including the SM message may be transmitted to the AMF by the MM sublayer. Here, the SM sublayer may correspond to the sublayer defined in the UE for PDU session control and the MM sublayer may correspond to a sublayer defined in the UE for mobility control of the UE. The UL NAS message may further include a DNN and/or S-NSSAI used for the selection of the SMF to delivery the SM message. Further, the UL NAS message may further include a PDU session ID for the PDU session for which establishment is requested when the SM message is a message for requesting establishment of the PDU session.

Next, the UE may receive an indication message indicating the unroutable of the SM message from the AMF (S2320). The indication message may further include an unroutable reason value of the SM message. The indication information indicating the unroutable of the SM message may be generated by the MM sublayer receiving the indication message and delivered to the SM sublayer of the UE. In this case, the MM sublayer may also transmit information on whether the unroutable SM message is permanent or temporary together with the indication information to the SM sublayer. If the unroutable SM message is permanent, the SM sublayer may proceed with the release procedure for the PDU session and/or DN associated with the SM message. Furthermore, the SM sublayer may manage the PDU session and/or DN (in particular, identification information for the PDU session and/or DN) in a procedure progress prohibition list in order to prevent an additional procedure for the PDU session and/or DN from being performed. If the service related to the corresponding PDU session and/or DN is required, the SM sublayer may request the deregistration to the MM layer and trigger a procedure for finding a new PLMN.

If the SM sublayer delivers the SM message to the MM sublayer, a preset timer may be started. If the SM sublayer receives the indication information from the MM sublayer before expiry of the timer, the SM sublayer may stop the timer and stop the procedure (e.g., PDU session establishment/change procedure, etc.) associated with the SM message. If the timer expires, the SM sublayer may redeliver the SM message to the MM sublayer a predetermined number of times, and if the predetermined number of retransmissions are unsuccessful, the SM sublayer may stop the procedure (e.g., the PDU session establishment/change procedure) associated with the SM message.

Figure 24:
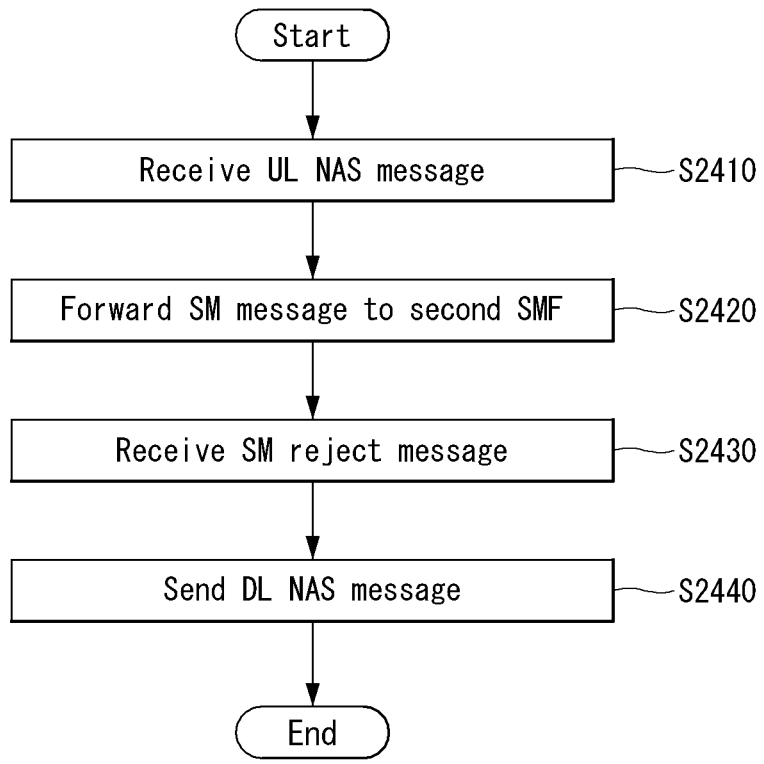
FIG. 24 is a flowchart illustrating a method for delivering an NAS message of an AMF according to an embodiment of the present invention.

FIG. 24 is a flowchart illustrating a method for delivering an NAS message of an AMF according to an embodiment of the present invention. The embodiment/description proposed by Invention Proposal 2 above may be applied in the same or similar manner to the flowchart, and a duplicated description will be omitted.

First, the AMF may receive an Uplink (UL) NAS message including an SM message for a PDU session related request (e.g., PDU session establishment/change, etc.) from the UE (S2410). The UL NAS message may correspond to the MM message in which the SM message is included/piggybacked.

Next, the AMF may deliver the SM message to a predetermined second SMF when determining that it is impossible to route the SM message to a first SMF as a delivery target of the SM message. In this case, the AMF may determine that the SM message is unroutable based on various reasons and for example, when a PDU session related request target through the SM message is an already locally released PDU session, the AMF may determine that it is impossible to route the SM message to the first SMF. The SM message may be delivered to the second SMF through a first N11 message. Further, a reason of the unroutable of the SM message may also be delivered to the second SMF through the first N11 message together with the SM message.

Next, the AMF may receive the SM rejection message for the SM message from the second SMF (S2430). Here, the second SMF is an SMF defined independently of the first SMF in order to process the unroutable of the SM message. Such a second SMF may be implemented as a NAS sublayer in the AMF rather than the default SMF or a separate SMF according to an embodiment.

Next, the AMF may transmit the DL NAS message including the SM rejection message to the UE. In this case, further, although not shown in the flowchart, the AMF may receive a retry backoff timer value of the PDU session related request from the second SMF.

If the PDU session is locally released, the AMF may receive a second N11 message from the first SMF. In this case, the second N11 message may include an ID, a local release indication, and/or a local release reason of the PDU session. In this case, the AMF may update state (e.g., release state) information for the locally released PDU session based on the received second N11 message. The ID, the local release indication, and/or the local release reason of the PDU session may be delivered from the AMF to the second SMF or from the first SMF to the second SMF.

Through the proposed invention, since it is possible to perform inter-NAS layer/entity interaction/information exchange which against various message transmission/routing failure situations which may occur when an SM layer procedure and an MM layer procedure are independently separated and simultaneously performed in 5GS and 5GC, message transmission reliability/efficiency of a terminal and a network can be enhanced and various problems can be solved, which may occur due a message transmission/routing failure.

Overview of Devices to which Present Invention is Applicable

Figure 25:
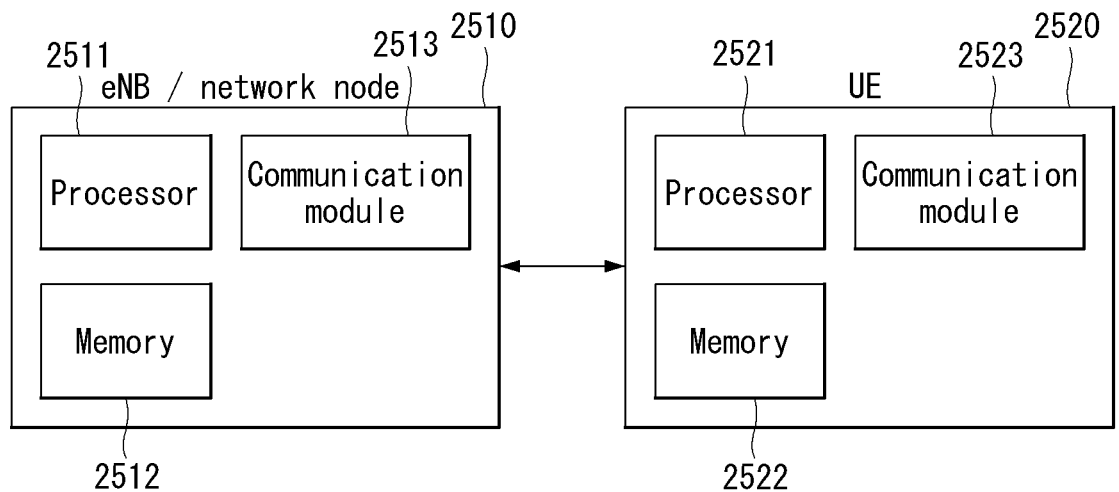
FIG. 25 illustrates a block diagram of a communication apparatus according to an embodiment of the present invention.

FIG. 25 illustrates a block diagram of a communication apparatus according to an embodiment of the present invention.

Referring to FIG. 25, a wireless communication system includes a network node 2510 and multiple user equipments 2520.

The network node 2510 includes a processor 2511, a memory 2512, and a communication module 2513. The processor 2511 implements a function, a process, and/or a method which are proposed above. Layers of a wired/wireless interface protocol may be implemented by the processor 2511. The memory 2512 is connected with the processor 2511 to store various pieces of information for driving the processor 2511. The communication module 2513 is connected with the processor 2511 to transmit and/or receive a wired/wireless signal. An example of the network node 2510 may correspond to a base station, MME, HSS, SGW, PGW, an application server, etc. In particular when the network node 2510 is the base station, the communication module 2513 may include a radio frequency (RF) unit for transmitting/receiving the wireless signal.

The UE 2520 includes a processor 2521, a memory 2522, and a communication module (or RF unit) 2523. The processor 2521 implements a function, a process, and/or a method which are proposed above. The layers of the wireless interface protocol may be implemented by the processor 2521. The memory 2522 is connected with the processor 2521 to store various pieces of information for driving the processor 2521. The communication module 2523 is connected with the processor 2521 to transmit and/or receive the wireless signal.

The memories 2512 and 2522 may be positioned inside or outside the processors 2511 and 2521 and connected with the processors 2511 and 2521 by various well-known means. Further, the network node 2510 (when the network node 2520 is the base station) and/or the UE 2220 may have a single antenna or multiple antennas.

Figure 26:
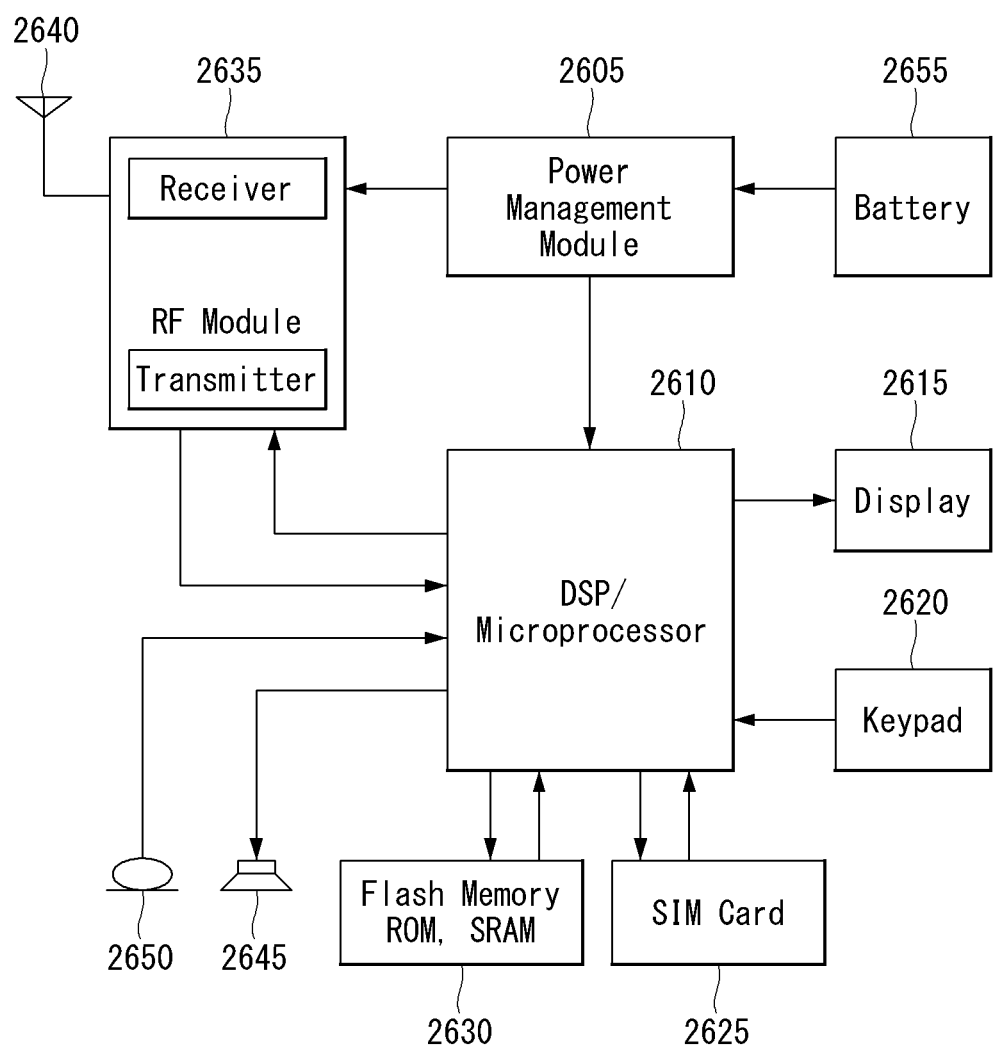
FIG. 26 illustrates a block diagram of a communication apparatus according to an embodiment of the present invention.

FIG. 26 illustrates a block diagram of a communication apparatus according to an embodiment of the present invention.

In particular, FIG. 26 is a diagram more specifically illustrating the UE of FIG. 25 above.

Referring to FIG. 26, the UE may be configured to include a processor (or a digital signal processor (DSP) 2610, an RF module (or RF unit) 2635, a power management module 2605, an antenna 2640, a battery 2655, a display 2615, a keypad 2620, a memory 2630, a subscriber identification module (SIM) card 2625 (This component is optional), a speaker 2645, and a microphone 2650. The UE may also include a single antenna or multiple antennas.

The processor 2610 implements a function, a process, and/or a method which are proposed above. Layers of a wireless interface protocol may be implemented by the processor 2610.

The memory 2630 is connected with the processor 2610 to store information related to an operation of the processor 2610. The memory 2630 may be positioned inside or outside the processor 2610 and connected with the processor 2610 by various well-known means.

A user inputs command information such as a telephone number or the like by, for example, pressing (or touching) a button on the keypad 2620 or by voice activation using the microphone 2650. The processor 2610 receives such command information and processes to perform appropriate functions including dialing a telephone number. Operational data may be extracted from the SIM card 2625 or the memory 2630. In addition, the processor 2610 may display command information or drive information on the display 2615 for the user to recognize and for convenience.

The RF module 2635 is connected with the processor 2610 to transmit and/or receive an RF signal. The processor 2610 transfers the command information to the RF module 2635 to initiate communication, for example, to transmit wireless signals constituting voice communication data. The RF module 2635 is constituted by a receiver and a transmitter for receiving and transmitting the wireless signals. The antenna 2640 functions to transmit and receive the wireless signals. Upon receiving the wireless signals, the RF module 2635 may transfer the signal for processing by the processor 2610 and convert the signal to a baseband. The processed signal may be converted into to audible or readable information output via the speaker 2645.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

In this specification, the expression of 'A and/or B' used in this specification may mean at least one of A and B.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

INDUSTRIAL APPLICABILITY

The present invention is described based on an example applied to the 3GPP LTE/LTE-A/NR (5G) system, but the present invention may be applied to various wireless communication systems in addition to the 3GPP LTE/LTE-A/NR (5G) system.

The invention claimed is:

1. A method for transporting a non-access stratum (NAS) message of an access and mobility management function (AMF) in a wireless communication system, the method comprising:
receiving, from a user equipment (UE), an uplink (UL) NAS message including a session management (SM) message for a request related to a protocol data unit (PDU) session;
transporting, to a predetermined second Session Management Function (SMF), the SM message based on a determination that it is impossible to route the SM message to a first SMF as a transport target of the SM message;
receiving, from the second SMF, an SM rejection message for the SM message; and
transmitting, to the UE, a downlink (DL) NAS message including the SM rejection message.

2. The method of claim 1, wherein the second SMF is an SMF defined independently of the first SMF to process routing impossibility of the SM message.

3. The method of claim 2, wherein the second SMF is a default SMF.

4. The method of claim 2, wherein the SM message is transported to the second SMF through a first N11 message.

5. The method of claim 4, wherein a reason for the routing impossibility of the SM message is transported to the second SMF through the first N11 message together with the SM message.

6. The method of claim 5, further comprising:
receiving, from the second SMF, a retry backoff timer value of the request related to the PDU session.

7. The method of claim 6, further comprising:
receiving, from the first SMF, a second N11 message based on the PDU session being locally released.

8. The method of claim 7, wherein the second N11 message includes an ID, a local release indication, or a local release reason of the PDU session.

9. The method of claim 8, wherein the ID, the local release indication, and/or the local release reason of the PDU session are transported from the AMF to the second SMF or from the first SMF to the second SMF.

10. The method of claim 9, further comprising:
updating state information for the locally released PDU session.

11. The method of claim 10, wherein based on a request target related to the PDU session through the SM message being the locally released PDU session, it is determined that it is impossible to route the SM message to the first SMF.

12. An apparatus configured to implement an Access and Mobility management Function (AMF) to perform transporting of a non-access stratum (NAS) message in a wireless communication system, the apparatus comprising:
a communication module; and
a processor configured to
receive, from a user equipment (UE), an uplink (UL) NAS message including a session management (SM) message for a request related to a protocol data unit (PDU) session,
transport, from the AMF to a predetermined second Session Management Function (SMF), the SM message based on a determination that it is impossible to route the SM message to a first SMF as a transport target of the SM message,
receive, by the AMF from the second SMF, an SM rejection message for the SM message, and
transmit, to the UE, a downlink (DL) NAS message including the SM rejection message.

13. The apparatus of claim 12, wherein the second SMF is an SMF defined independently of the first SMF to process routing impossibility of the SM message.

14. The apparatus of claim 13, wherein the SM message is transported to the second SMF through a first N11 message.

15. The apparatus of claim 14, wherein a reason for the routing impossibility of the SM message is transported to the second SMF through the first N11 message together with the SM message.

* * * * *